(12) United States Patent
Deak et al.

(10) Patent No.: US 9,343,931 B2
(45) Date of Patent: May 17, 2016

(54) ELECTRICAL GENERATOR WITH ROTATIONAL GAUSSIAN SURFACE MAGNET AND STATIONARY COIL

(71) Applicants: David Deak, Ronkonkoma, NY (US); David Deak, Jr., Ronkonkoma, NY (US); Robert Happenheimer, Northport, NY (US); Ronald Ranieri, Smithtown, NY (US)

(72) Inventors: David Deak, Ronkonkoma, NY (US); David Deak, Jr., Ronkonkoma, NY (US); Robert Happenheimer, Northport, NY (US); Ronald Ranieri, Smithtown, NY (US)

( * ) Notice: Subject to any disclaimer, the term of this patent is extended or adjusted under 35 U.S.C. 154(b) by 0 days.

(21) Appl. No.: 13/775,461

(22) Filed: Feb. 25, 2013

(65) Prior Publication Data
US 2014/0375164 A1 Dec. 25, 2014

Related U.S. Application Data

(60) Provisional application No. 61/621,135, filed on Apr. 6, 2012.

(51) Int. Cl.
| | |
|---|---|
| *H02K 1/27* | (2006.01) |
| *H02K 21/14* | (2006.01) |
| *H02K 7/18* | (2006.01) |
| *H02K 1/02* | (2006.01) |

(52) U.S. Cl.
CPC ............... *H02K 1/272* (2013.01); *H02K 1/02* (2013.01); *H02K 1/2706* (2013.01); *H02K 7/1853* (2013.01); *H02K 21/145* (2013.01); *H02K 2201/18* (2013.01)

(58) Field of Classification Search
CPC ....... H02K 1/272; H02K 1/27; H02K 1/2706; H02K 7/003; H02K 7/14; H02K 7/183; F03D 9/002
USPC .......... 310/156.43, 156.36, 156.38, 75 R, 80, 310/181
See application file for complete search history.

(56) References Cited

U.S. PATENT DOCUMENTS

| | | | | |
|---|---|---|---|---|
| 5,204,570 | A * | 4/1993 | Gerfast | 310/156.38 |
| 6,326,714 | B1 * | 12/2001 | Bandera | 310/156.38 |
| 2003/0025416 | A1 * | 2/2003 | Sullivan | H02K 1/02 310/162 |
| 2004/0124729 | A1 * | 7/2004 | Long | 310/156.38 |
| 2005/0006961 | A1 * | 1/2005 | Shen | 310/50 |
| 2011/0273052 | A1 * | 11/2011 | Long et al. | 310/208 |

* cited by examiner

*Primary Examiner* — Michael Andrews

(57) ABSTRACT

A Gaussian Surface Neodymium magnet of at least one or a plurality of spherical or any other Gaussian Surface configuration that is seated in the center of a stationary coil and whereby said magnet or plurality of magnets remains free to rotate about its axis within said coil; and whereby said magnet is capable of continuous, interrupted, or mechanically pulsed movement for the generation of electrical induced current within said stationary coil; and said magnetic field of said magnet is concentrated and focused by at least one or a plurality of focus Neodymium magnets for induced current enhancement; and whereby focus magnet fields are inline and parallel to said center rotational magnet(s).

9 Claims, 32 Drawing Sheets

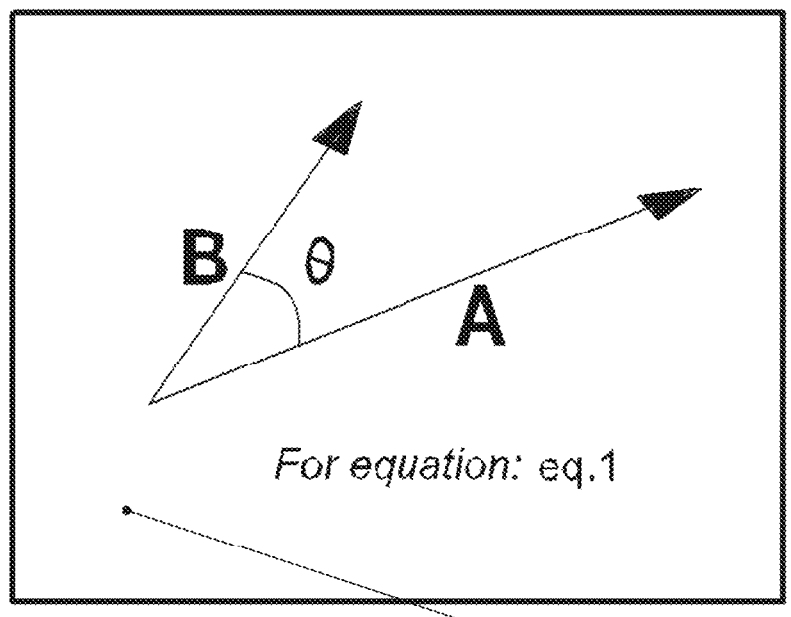
1G
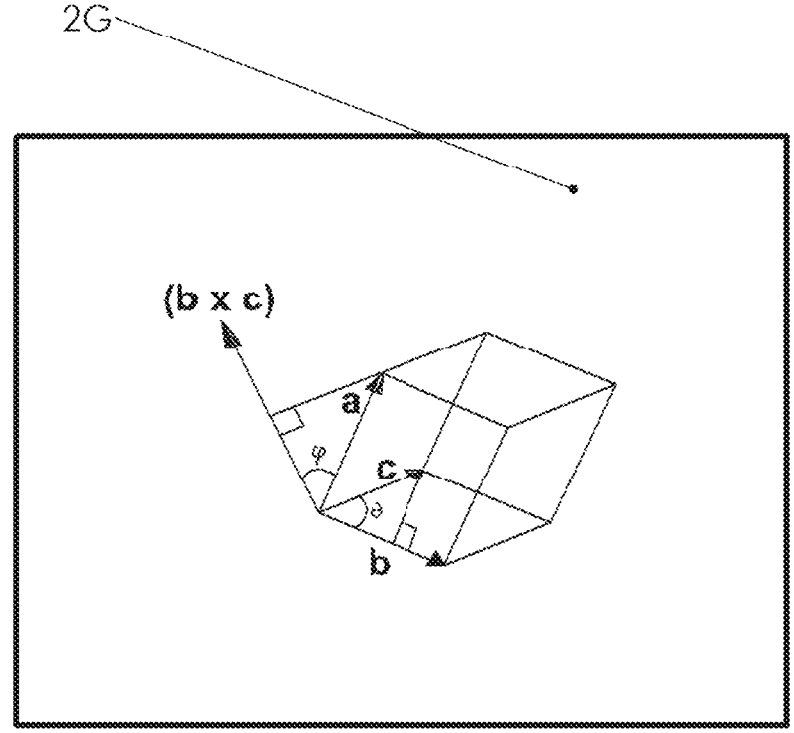
2G
FIG 10

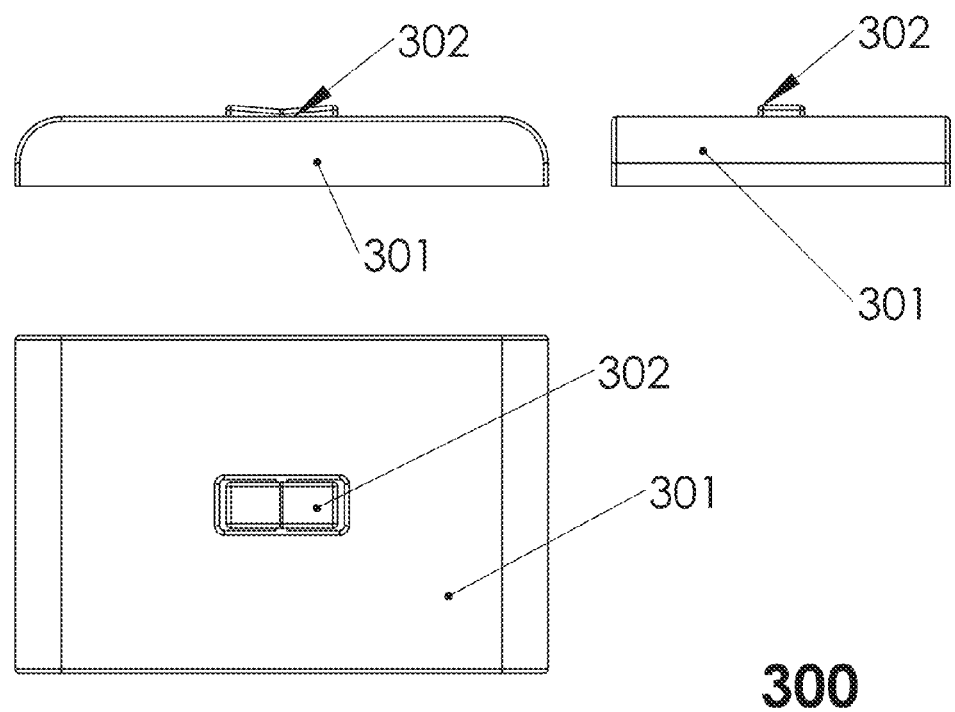
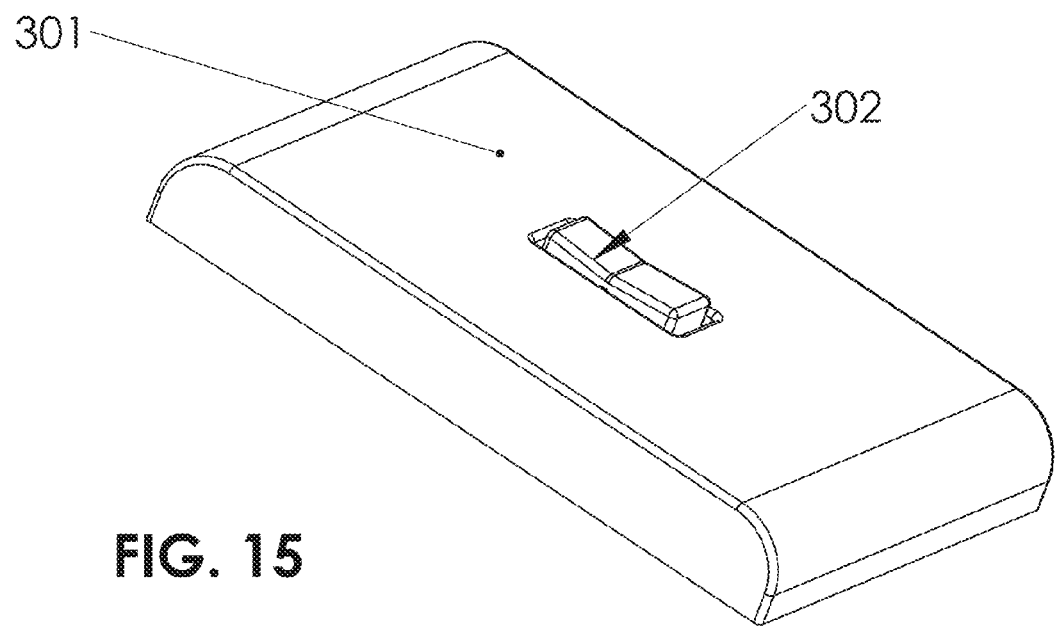
FIG. 15

ELECTRICAL GENERATOR WITH ROTATIONAL GAUSSIAN SURFACE MAGNET AND STATIONARY COIL

BACKGROUND OF THE INVENTION

The present invention relates to electric generators and the generation of electricity from same; along with a plurality of novel embodiments and applications utilizing these features of novelty. The evolution of electric generators since the inception of Galvani and later Faraday in 1821 and in 1831; has progressed along the conventional knowledge of moving a coil through a stationary magnetic field or in some demonstrable instances, the motion of a magnet through a stationary coil. However the dominating influence of generators incorporating an internal moving coil about a stationary magnetic field remains the mainstay of global electrical power generation on any scale. Further, in all cases of a magnet in motion about a stationary coil, the shape of the magnet(s) is of the bar, horseshoe, or other non-spherical magnet shape; nor a magnetic shape means of encompassing a 360 degree circle as part and parcel to the magnet(s). This is true even after the infusion of so many patents of prior art credited to Thomas Edison, Nicola Tesla and historically a multitude of others.

SUMMARY OF THE INVENTION

This present invention relates to a plurality of embodiments for generating electrical energy utilizing a mathematically valid Gaussian Surface spherical or an axial-spherical permanent magnet or a plurality of a spherical or axial-spherical permanent magnet, but not confined to only a spherical shaped magnet; as the source of magnetic lines of a circuitous encompassing force field from magnetic pole to magnetic pole.

The present invention also relates to an embodiment for generating electrical energy utilizing a non-magnetic spherical or axial-spherical material that utilizes a non-spherical magnet as an enclosed embodiment member; the non-spherical magnet can be of a cylinder or disk magnet enclosed within or on the surface of the non-magnetic spherical or axial.

The present invention also relates as an embodiment for generating electrical energy utilizing a centered axle Gaussian Surface or modified centered axle Gaussian Surface, which either having a distribution of a magnetic field as the source of magnetic lines of a circuitous encompassing force field from magnetic pole to magnetic pole utilized to generate and induced voltage as determined by the Faraday equation;

$$E = -N\frac{d\Phi_B}{dt}.$$

Said magnetic field of said centered axle Gaussian Surface embodiment can exist as intrinsic and characteristic to a permanent magnet shaped as centered axle Gaussian Surface or a single or plurality of permanent magnets distributed throughout the circumference of a non-magnetic material means Gaussian Surface.

A mathematically valid Gaussian Surface is defined as a three dimensional space closed surface.

The present invention teaches that momentary or sustained movement of a rotating spherical or axial-spherical permanent magnet and its associated surrounding and encompassing magnetic field lines of force generates electrical power by the action of said lines of force cutting through a stationary coil of insulated wire whose wire alignment is perpendicular to said lines of force at all intervals of time.

This action of electrical power generation is achieved either by a simple rotating Gaussian Surface spherical permanent magnet means or a rotating axial-spherical permanent magnet, whereby said Gaussian Surface spherical permanent magnet or a rotating axial-spherical permanent magnet free to move omni-directionally about its centre axis point, at the centre of a stationary coil, and the coil is fixed to an attached base of a mounting substrate. The present invention also teaches that strategic placement of a focus magnet or a plurality of focus magnets around the outside of said stationary coil, whose magnetic field lines are aligned parallel to the planar surface of said stationary coil and perpendicular to any instant point along said coil winding, will enhance the Faraday effect for optimum efficiency.

Variations of the present invention's method means of rotating a permanent magnetic field normal to the coil wire's position, whereby the permanent magnetic field is rotating about the centre core epicentre of said coil is not restricted to being at epicentre and can be a plurality of rotating permanent magnets that are positioned normal and off-centre to the coil wires. The wire coil in a plurality of permanent magnets can have a plurality of shapes; such as a circle, oval, square, or rectangular shape geometry. The coil member means is not restricted to one coil and can have as an embodiment; a plurality of coil member means that are positioned around the said epicentred spherical magnetic member.

Another aspect of embodiments of the present invention is utilized in a sufficiently scaled configuration, utilized to power an ISM (Industrial, Scientific, and Medical) band low RF power transceiver, such as a ZigBee or similar transceiver, but not restricted to any one transmitter or transceiver to remotely control and operate an electrical appliance means or general load such as lighting systems, motors, or other so electrical apparatus. The primary purpose of said present invention in this instance is to eliminate the battery requirement for such device means. It is the intention of said present invention to utilize an ISM band low power RF transceiver member means that is to turn on and off electrical lighting, and is designed to include a intensity dimming apparatus in addition to said on/off switching apparatus.

Another aspect of embodiments of said present invention is utilized in a sufficiently "scaled-up" configuration to transduce the energy contained in ambient environmental air (wind) movement into harvested electrical energy for introducing and releasing said electrical energy into power mains grid networks; as a means for reducing home, commercial, or industrial electrical energy costs in addition to land vehicles, aircraft, or sea craft.

Another aspect of embodiments of said present invention is utilized in a sufficiently "scaled-up" configuration to transduce the energy contained in ambient environmental air (wind) movement into harvested electrical energy for utilization in motor vehicles of the classifications of internal combustion, hybrid, or total electric operation for increasing the efficiency and usable mileage per charge on said vehicle classifications.

Another aspect of embodiments of said present invention is utilizing a Gaussian Surface spherical or axial-spherical neodymium or other rare earth magnet that has its magnetic poles normal to its horizontal spherical axis.

Another aspect of embodiments of said present invention is to utilize a flat planar coil of wire sufficient to generate scaled applicable electrical energy for any intended application.

Another aspect of embodiments of said present invention is to utilize a flat planar coil of wire that has at its centre, a thru-hole for placement of the spherical or axial-spherical magnet wherein the magnet can rotate within said thru-hole.

Another aspect of embodiments of said present invention is to utilize a flat planar coil of wire that has at its centre, a thru-hole or modified hole to accommodate a spherical or axial-spherical magnet where said axial-spherical magnet axis can rotate on bearings that are utilized to prolong rotational spin after a force is applied to induce prolonged spin.

Another aspect of embodiments of said present invention is to utilize a plurality of Gaussian Surface spherical or axial-spherical magnets aligned in a common axial configuration within the centre section of a coil for the purpose of increasing the electrical power output capacity of the present invention.

Another aspect of embodiments of the present invention is to utilize a plurality of coils in conjunction with a plurality of Gaussian Surface spherical or axial-spherical magnets to increase the power output of the present invention.

Another aspect of embodiments of said present invention is to utilize a focus or alignment magnet, or a plurality of focus or alignment magnets, physically installed and situated in a manner that has its intrinsic magnetic field lines of force parallel to the horizontal flat planar surface region of the coil. The purpose of which is to concentrate the lines of force from the Gaussian Surface magnet or plurality of magnets to increase power output of the present invention, satisfying the Faraday equation;

$$E = -N\frac{d\Phi_B}{dt}.$$

where E is the induced voltage, $$\frac{d\Phi_B}{dt}$$

is the time derivative of the change in the superimposed ambient magnetic field $\Phi B$ of the neodymium magnet that is concentrated by said focusing magnets, −N is the number of turns of the coil and the minus sign indicates that the EMF induced in an electric circuit always acts in such a direction that the current it drives around the circuit, opposes the change in magnetic flux which produces the EMF.

Another aspect of the present invention is to utilize the inherent characteristic of relative angle of said ambient magnetic field against the stationary position of the coil member means as a methodology of measuring angular deviation for any useable purpose. Whereby any such angular deviation of either the magnetic field of the Gaussian Surface magnet relative to the stationary coil will cause an induced voltage and whose magnitude and polarity is determined by the two dimensional dot product of the stationary coil position and alignment vector and the directional and polar position and alignment vector of the Gaussian Surface magnetic field as expressed as;

$A_S \cdot B_M$=the dot product:

$A_S \cdot B_M = |A_S|*|B_M|*\cos(\theta)$;

where $A_S$ and $B_M$ are vectors; as example vector $A_S$ is the stationary coil wire position in space and vector $B_M$ is the polar direction of the moveable North pole of the Gaussian Surface magnetic field.

Given the characteristics of the cosine function, one can deduce three possible conditions:
1. If $A_S$ and $B_M$ are perpendicular (at 90 degrees to each other), the result of the dot product will be zero, because $\cos(\theta)$ will be zero.
2. If the angle between $A_S$ and $B_M$ are less than 90 degrees, the dot product will be positive (greater than zero), as $\cos(\theta)$ will be positive, and the vector lengths are always positive values.
3. If the angle between $A_S$ and $B_M$ are greater than 90 degrees, the dot product will be negative (less than zero), as $\cos(\theta)$ will be negative, and the vector lengths are always positive values.

Another aspect of said present invention is in a condition where the converse holds true, where the moving Gaussian Surface magnetic field is held stationary and the coil is then made moveable, and the dot product of the two vectors;

$A_M \cdot B_S$=the dot product:

$A_M \cdot B_S = |A_M|*|B_S|*\cos(\theta)$;

where $A_M$ and $B_S$ are vectors; as example vector $A_M$ is the moving coil wire position in 160 space and vector $B_S$ is the polar direction of the North pole of the stationary Gaussian Surface magnetic field.

Given the characteristics of the cosine function, one can deduce three possible conditions:
1. If $A_M$ and $B_S$ are perpendicular (at 90 degrees to each other), the result of the dot product will be zero, because $\cos(\theta)$ will be zero.
2. If the angle between $A_M$ and $B_S$ are less than 90 degrees, the dot product will be positive (greater than zero), as $\cos(\theta)$ will be positive, and the vector lengths are always positive values.
3. If the angle between $A_M$ and $B_S$ are greater than 90 degrees, the dot product will be negative (less than zero), as $\cos(\theta)$ will be negative, and the vector lengths are always positive values.

This aspect of the present invention can see appliqués in two dimensional directional guidance and other usage in angular determination and detection applications; where an induced coil voltage represents a two dimensional differential angular condition, value and direction and recognized as a usable two dimensional coefficient in any applied analysis system.

The general reference equation 1:

$$A°B = AB \cos(\theta) \qquad \text{eq. 1}$$

Another aspect of the resent invention is in the three dimensional analysis of yaw, pitch, and roll coefficients in guidance systems or any three dimensional positional identification system.

The triple product general equation:
The triple product of a set of vectors a, b, and c is given by
The dot product of vector a, and the cross product of vectors b and c;

$$a°(b \times c) \qquad \text{eq. 2}$$

This referring to FIG. 14 graph 1G.
The value of the triple product is equal to the volume of the parallelepiped constructed from the vectors.

$$\text{volume} = abc \cdot \sin(\theta)\cos(\phi) \qquad \text{eq. 3}$$

$$a°(b \times c) = a|b \times c|\cos(\phi) = abc \cdot \sin(\theta)\cos(\phi) \qquad \text{eq. 4}$$

This referring to FIG. 14 graph 2G
The triple product has the following properties $$a°(b×c)=(b×c)°a \quad \text{eq. 5}$$

$$a°(b×c)=c°(a×b)=b°(c×a) \quad \text{eq. 6}$$

$$a°(b×c)=-a°(c×b) \quad \text{eq. 7}$$

Further where a is the coil wire direction vector, b is the Gaussian Surface magnetic field vector, and C is the vertical position of the Gaussian Surface magnet compared to its deviation from the center of the coil, i.e. either dead center and level with coil surface plane, coil-centered axis but left angular tilt from coil surface, or coil-centered axis but right angular tilt from the coil surface.

Another aspect of said present invention is for three dimensional detection of movement in yaw, roll, and the depth from coil-center axis either above or below said coil-center axis and defined as;

Where Vectors: $a_y$=yaw, $b_r$=roll, and $C_d$=depth from coil-center axis either above or below said coil-center axis.

Ergo, with vector analysis using dot and cross product results those additional aspects of said present invention include; a method means of utilizing a stationary coil member means with a moving Gaussian Surface magnetic means capable of moveable freedom within a three dimensions and the coil establishing a voltage, whose value and polarity are the resultant of movement of the Gaussian Surface magnet. Further it is also an alternative method means of utilizing a stationary Gaussian Surface magnet, and utilizing a moveable coil about the three dimensional volume of said centered Gaussian Surface magnet; and said coil establishing a voltage, whose value and polarity are the resultant of movement of the coil.

BRIEF DESCRIPTION OF THE DRAWINGS

FIG. 10 are a graph drawing of vectors for reference equation #1, and a vector diagram of three combined vectors;

FIG. 15 are elevation, plan and perspective views of a switch enclosure exposing a rocker style switch movement means according to an alternate embodiment of the present invention;

DETAILED DESCRIPTION OF THE PREFERRED EMBODIMENTS

Figure 1:
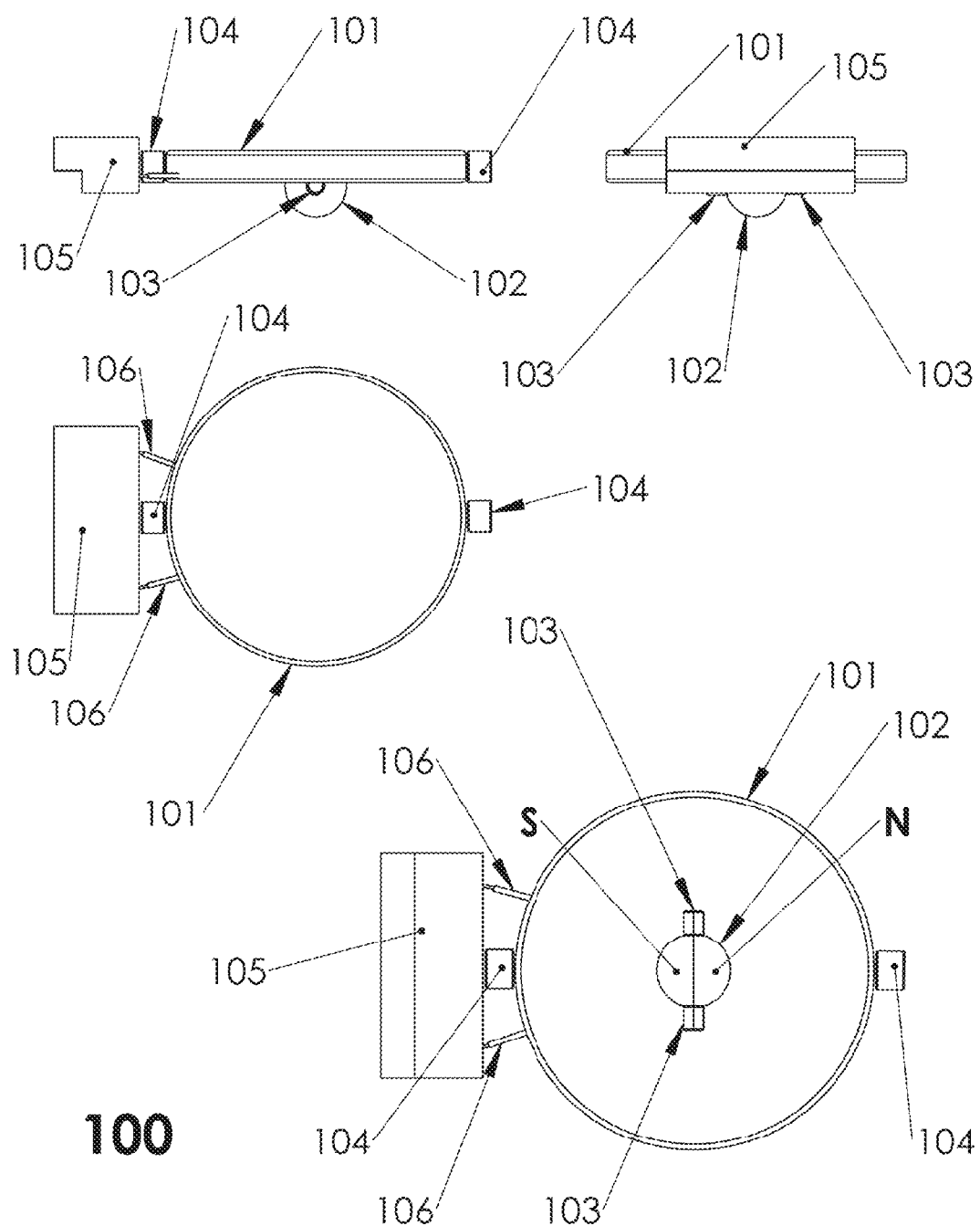
FIG. 1 are plan and elevation views of one embodiment of the present invention with coil-wire form with a rotating magnet, focusing magnets, and energy converter or appliance.

An embodiment 100 is shown in FIG. 1, of a stationary coil electrical generator 101 in communication with a magnet 102 centered axle (i.e. having a center axle), the stationary coil being in communication with at least one or a plurality of focus magnets 104 combined electromechanically and utilized as a power source including generator 101 and magnet 102 for an electrical power load 105 in the form of a ISM band transceiver 105 for the purpose of powering momentarily, allowing the transceiver 105 to emit electromagnetic waves of radio frequencies that are modulated with a digital code sequence but not limited to utilization as a power source for an electrical power load in the form of a ISM band transceiver and further can be utilized for a plurality of power source applications.

Figure 1A:
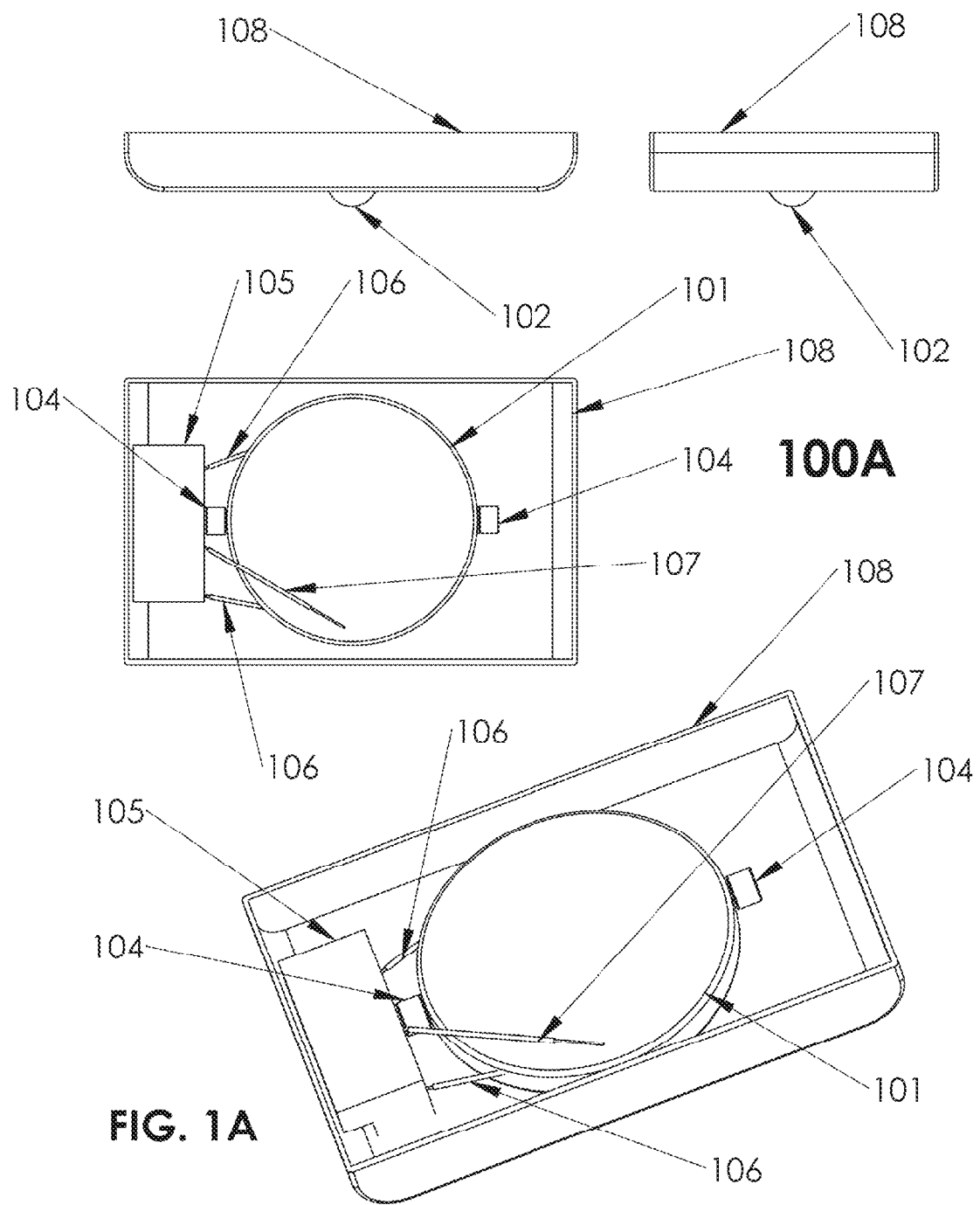
FIG. 1A are plan, elevation and perspective views of a cover plate used with the embodiment of FIG. 1.

Within FIG. 1A there is shown the same, but enhanced with enclosure 108 embodiment 100A with a protective enclosure 108. Power connexion leads 106 are connected to the power load 105 and with this embodiment the power load 105 is the ISM band transceiver 105 with attached antennas 107.

Figure 2:
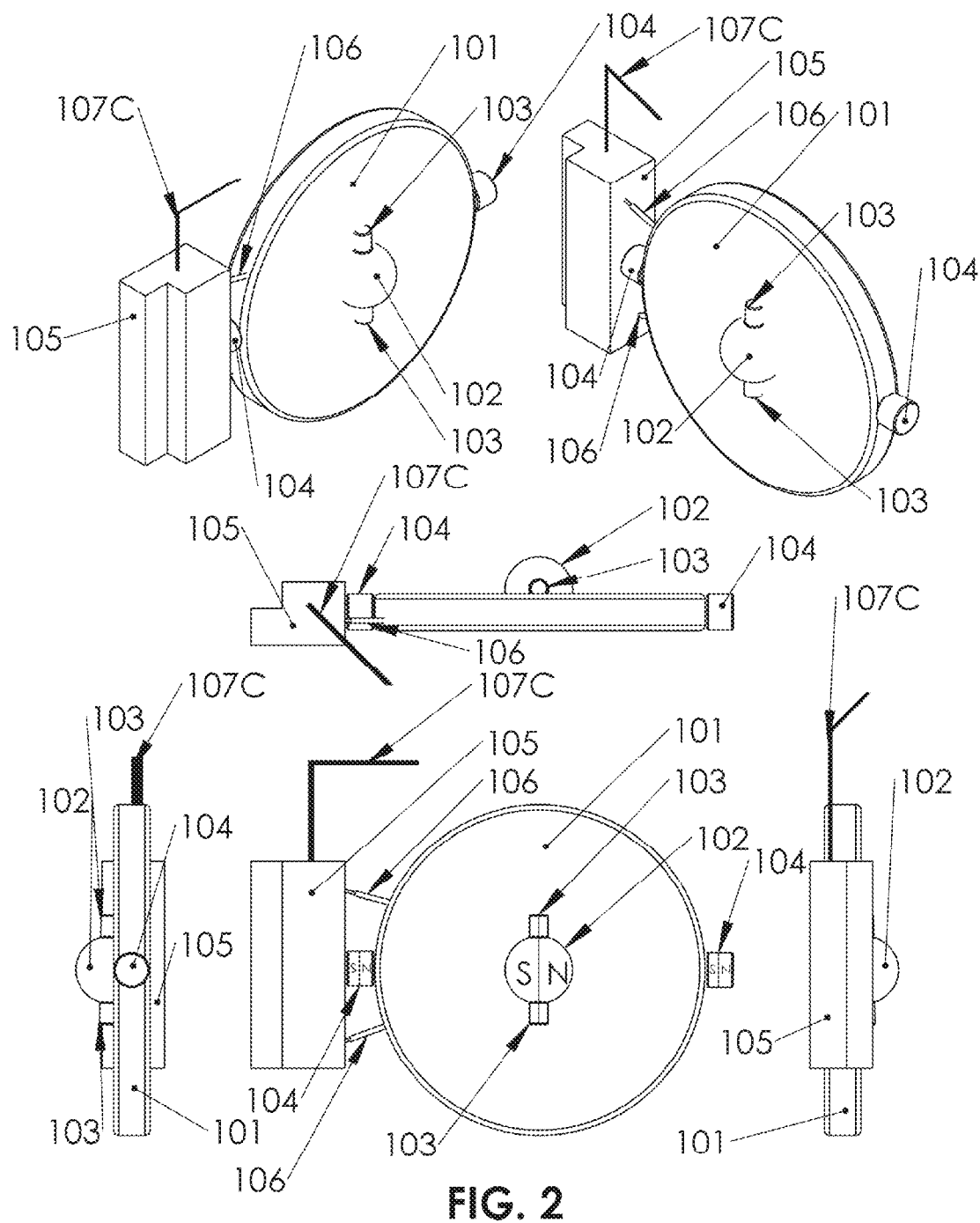
FIG. 2 are plan, elevation and perspective views for one embodiment of the present invention showing the polar alignment of the rotating and focusing magnets.

With reference to FIG. 2 a coil form 101 with its output power leads 106 are electrically connected and in communication with the power load 105, which in this illustrated embodiment is an ISM band radio transceiver 105 with associated antenna 107C. A spherical centered axle magnet 102 with axles for rotation 103 is positioned and in communication with the centre of the coil form 101. The spherical centered axle magnet 102 is magnetized with its North and South magnetic poles perpendicular to its axle of rotation 103, and is at right angles to the coil-wire turns and parallel to the tangent of said coil-wire turns. The magnetic field lines emanating from the North magnetic pole and entering the South magnetic pole of the spherical magnet 102 will therefore be at right angles to said coil-wire sections that are parallel to the spherical magnet axle 103. Upon rotation of the spherical magnet means 102 about its axle 103, the magnetic field (visually assumed and not illustrated) lines cut through said coil form 101 and induces an electromotive force resulting in a signal at the output leads 106. Said induced electromotive force is varying in intensity and polarity, thus generating an alternating electrical current utilized as a power source. In order to increase the amount of power produced by this action, a focus magnet 104 or a plurality of focus magnets 104 are positioned and in communication with the spherical centered axle magnet 102. Positioning of the focus magnets 104 are such that the focus magnet(s) 104 remain stationary with the South magnetic and North magnetic poles field lines that are aligned "inline parallel" to and in communication with the spherical magnet 102 field lines. This embodiment of the present invention allows for the action of concentration of the spherical magnet fields lines per unit square (area) so that more field lines cut through a coil-wire section thus producing more induced electromotive force (power). The amount of induced electromotive force is directly proportional to the number of lines per unit square (area).

Figure 3:
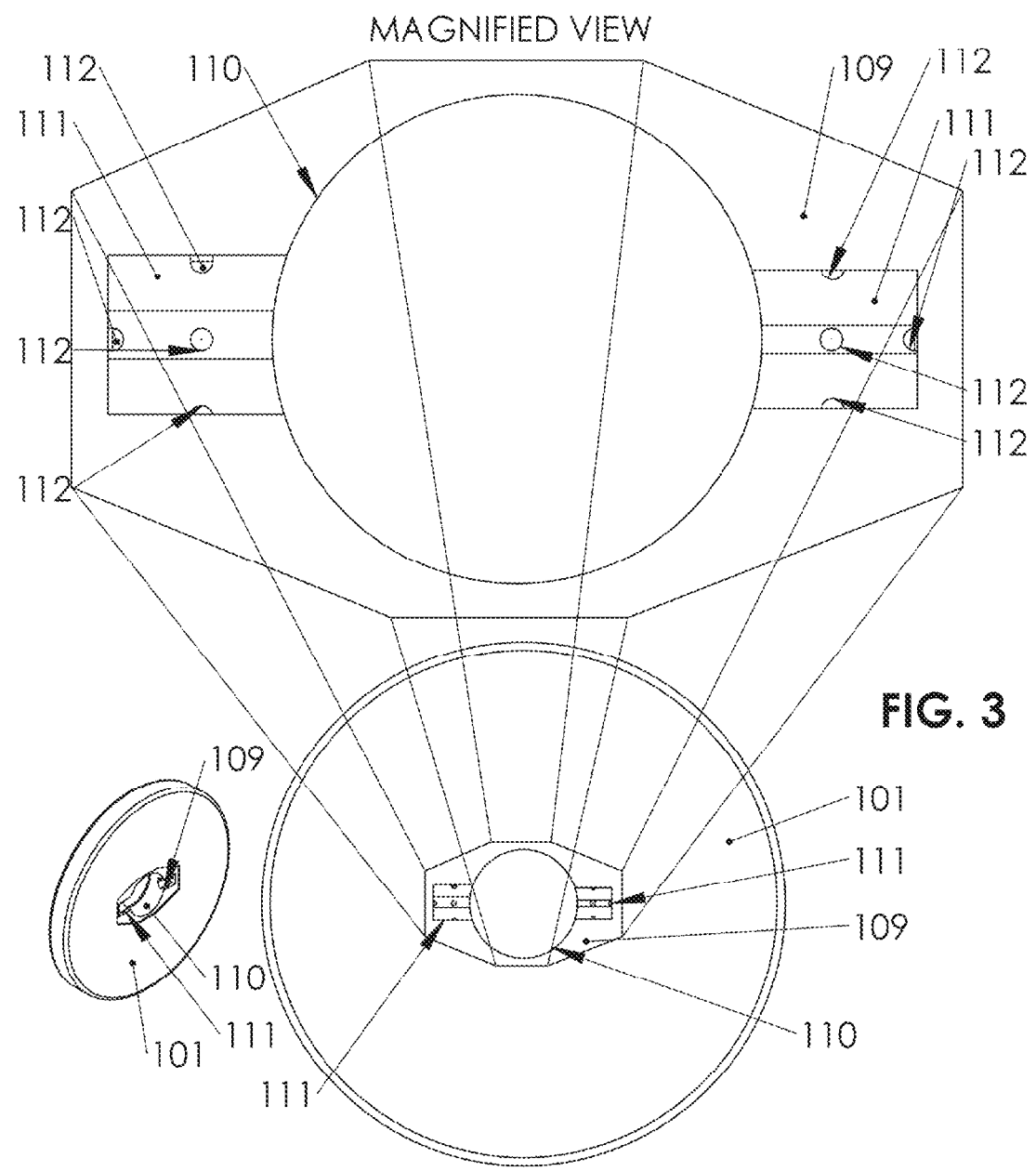
FIG. 3 is an exploded view of the rotating magnet's seating position within the coil-wire form according to one embodiment.

In FIG. 3, the coil-wire form is shown in an exploded view to further explain away the mounting of the spherical magnet 102 with its axle 103 that is in communication with recessed molded spherical magnet inset well 109 and cavity opening 110. The axle 103 is mounted into a support well 111 that allows for a smooth movement of the axle 103 in the process of spherical magnet 102 rotation. The rotation is further enhanced, fdr a minimum frictional mechanical impedance, by a plurality of unitized molded "standoff bearings" 112. The overall recessed molded spherical magnet inset well 109, is at coil-wire form 101 centre. The position of spherical magnet is positioned and recessed midway in coil-wire form but is not limited to any alternative position arrangement.

Figure 4:
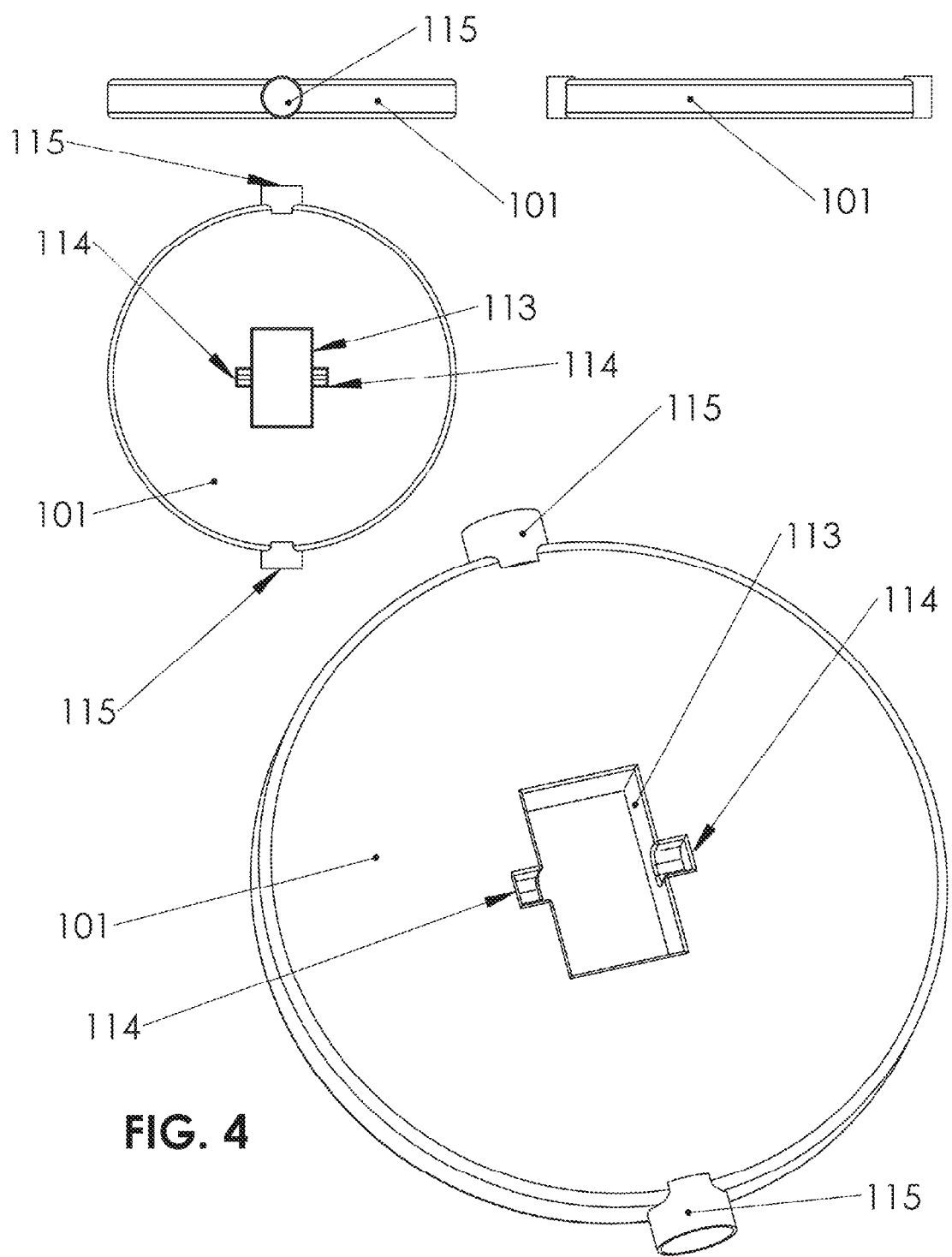
FIG. 4 are elevation, plan and perspective views of another of a rotating magnet coil-wire form for use with a rotating wheel magnet according to an alternate embodiment of the present invention.

Another embodiment feature of the present invention is shown in FIG. 4, whereby an alternative to said coil-wire form's recessed molded spherical magnet inset well 109 of FIG. 3 is now embodied and shown in FIG. 4 with a four sided open cavity 113 to accommodate and be in communication with a non-spherical magnet. The non-spherical four sided centered axlecentered axle magnet inset well 113 has axle inset wells 114 with the same enhanced rotational molded— standoff bearings as is shown in FIG. 3 for said spherical magnet embodiment. FIG. 4 also shows the focus magnet(s) 104 coil-wire form insert(s) 115 that holds stationary in position the focus magnet(s) on the said coil-wire form 101.

Figure 5:
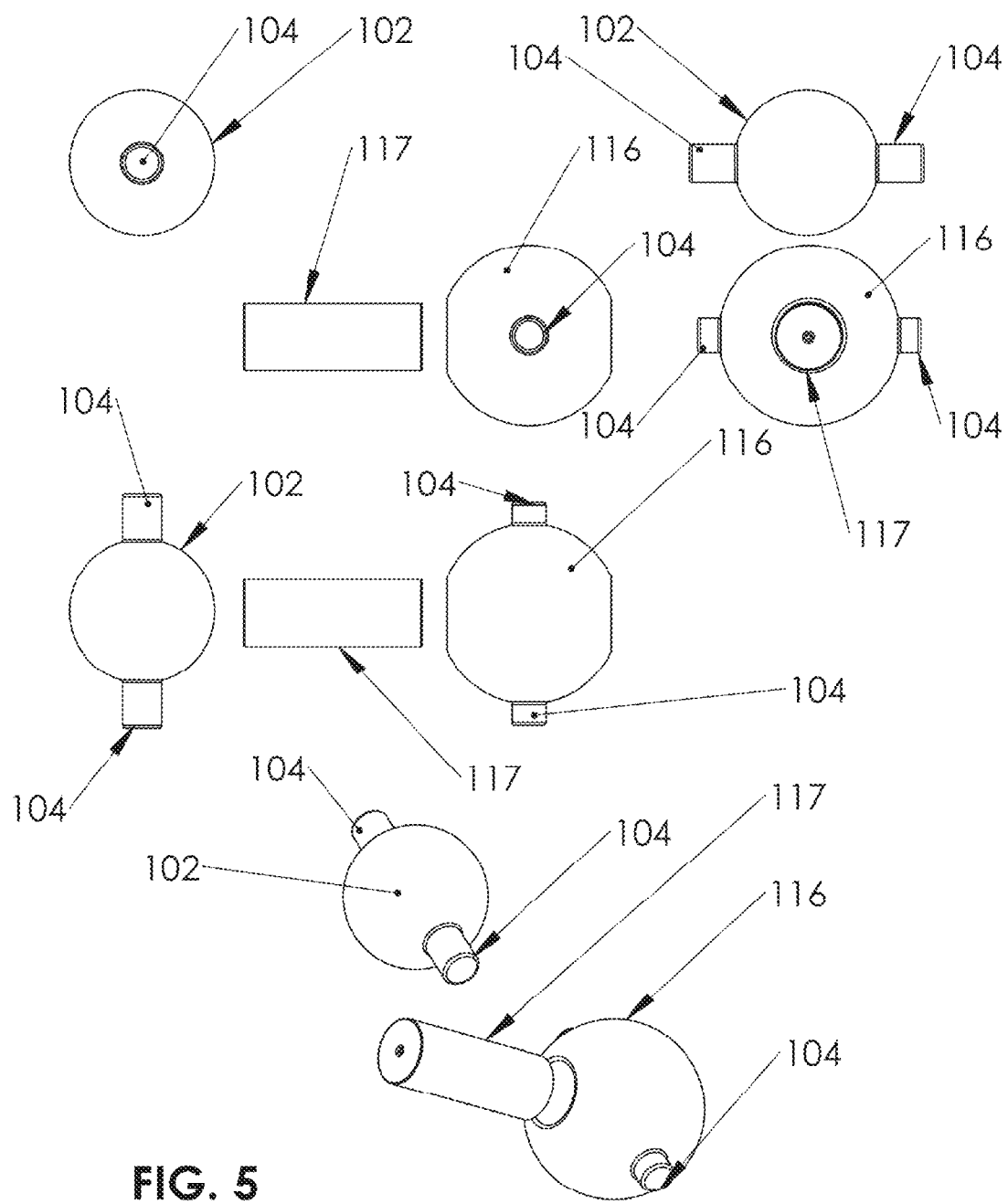
FIG. 5 are elevation, plan and perspective view of a modified spherical magnet of a non-magnetic material with a centered hole to insert a cylindrical bar magnet according to an alternate embodiment of the present invention.

Another advantageous embodiment feature of the present invention is shown in FIG. 5, whereby the spherical centered axle magnet configuration is replaced a modified model means for a spherical centered axle magnet equivalent comprising; a 365 non-magnetic material centered axle sphere 116 and attached sub form non-magnetic material axle 116A. A cavity through hole 116H exists in the spherical non-magnetic material and is perpendicular to said non-magnetic material axle 116A. A cylindrical magnet 117 is inserted in said cavity through hole 116H and is in communication with non-magnetic material sphere 116, and further the cylindrical magnet 117 has its North 370 and South magnetic poles at the opposite ends of the cylindrical shape and thereby has its magnetic field lines of force perpendicular to the axle 116A axis. This embodiment of the present invention is implemented to serve as an economic alternative to an intrinsic all metal spherical centered axle magnet.

Figure 6:
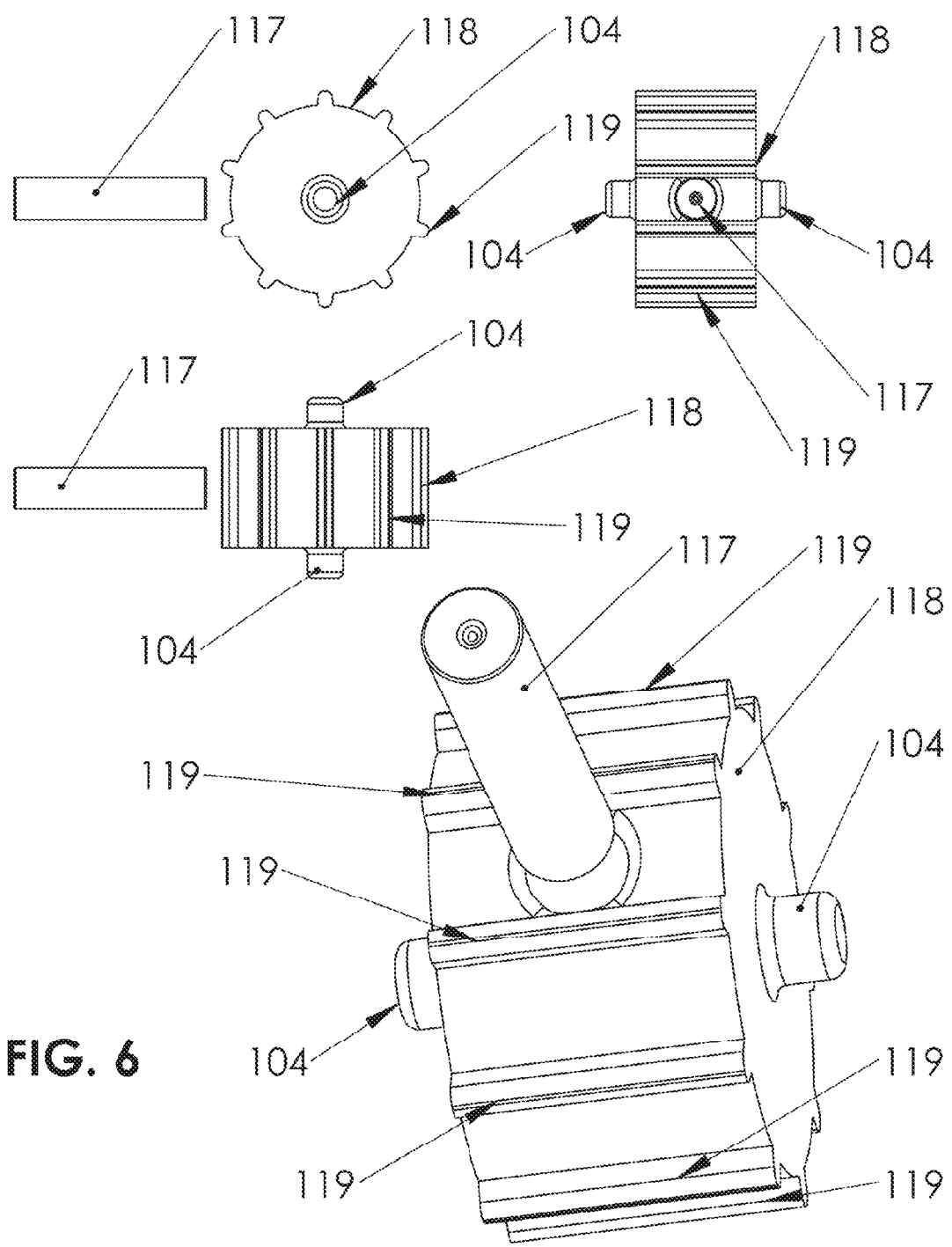
FIG. 6 are elevation, plan and perspective views of a modified non-metal rotatable wheel receiving a cylindrical bar magnet according to an alternate embodiment of the present invention.

Another advantageous embodiment feature of the present invention is shown in FIG. 6, whereby a centered axle wheel 118 comprised of a non-magnetic material and having a planar plurality of serrations 119, whereby the serrations are utilized as an enhancement to rotational momentum. A cylindrical magnet 117 is inserted in said cavity "through hole" 117H and is in communication with non-magnetic material centered axle wheel means 118, and further the cylindrical magnet 117 has its North and South magnetic poles at the opposite ends of the cylindrical shape means and thereby has its magnetic field lines of force perpendicular to axle 104 axis. This embodiment of the present invention is implemented to serve as an economic alternative to an intrinsic "all metal" serrated centered axle wheel magnet.

Figure 7:
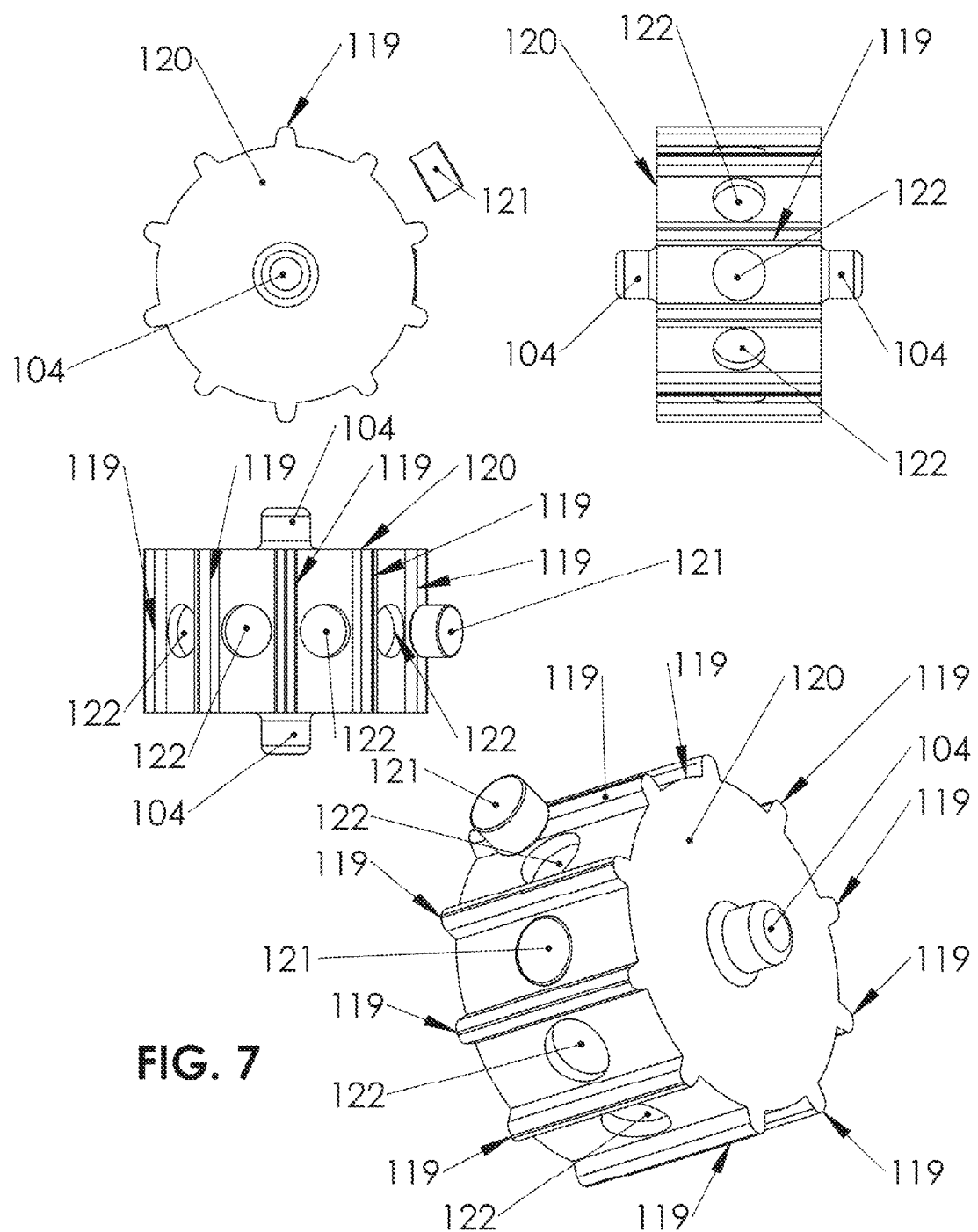
FIG. 7 are elevation, plan and perspective views of a non-metal magnet wheel comprising a plurality of pill magnet insertions slots according to an alternate embodiment of the present invention FIG. 8 are elevation, plan and perspective views of a further alternate embodiment of the present invention with a pill magnet wheel inserted into it slot in a coil-wire form with focusing magnets on opposite peripheral sides.

Another advantageous embodiment feature of the present invention is shown in FIG. 7, whereby a centented axle "wheel 120 comprised of a non-magnetic material and having a planar plurality of serrations 119, whereby the serrations are utilized as an enhancement to rotational momentum. Adjacent to each serration 119 is a recessed blind hole 122, utilized to accommodate an be in communication with an inserted cylindrical magnet 121 whose North and South poles are at opposite ends of the cylinder magnet 121, and its magnetic field lines of force are perpendicular to the axle 104 axis. The cylinder magnets 121 are rotated by the centered axle wheel 120 said magnets corresponding magnetic lines of force cut through the aforementioned coil-wire form 101 as shown in FIG. 4. The centered axle serrated wheel is inserted in axle well 114 and is free to rotate through the four sided opening 113.

Figure 8:
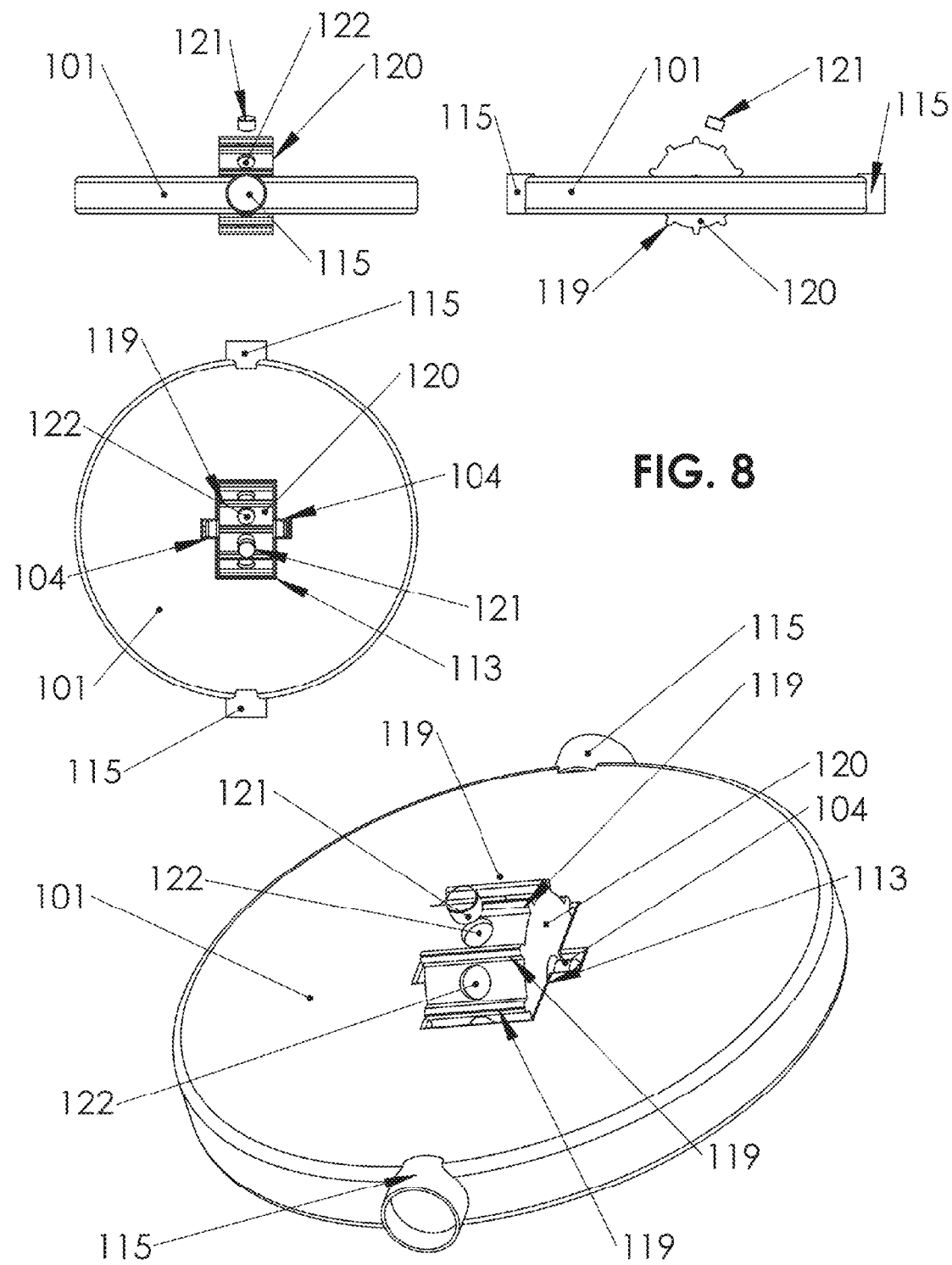

FIG. 8 illustrates the insertion of the centered axle wheel with an exploded view of the cylinder magnet 121 parallel and tangent to inset well 122. The centered axle wheel 120 is positioned in the four sided cavity opening 113, and as the wheel is rotated the plurality of cylinder magnets 121 move in a continuing circular path, with the perpendicular magnetic lines of force cutting through the coil-wire form and establishing an instant induced voltage for any useful purpose. The focus magnet inset well(s) 115 hold stationary the focus magnet(s) 104 in place. The centered axle serrated wheel 120 is inserted in axle well 114 and is free to rotate through the four sided opening 113.

Figure 9:
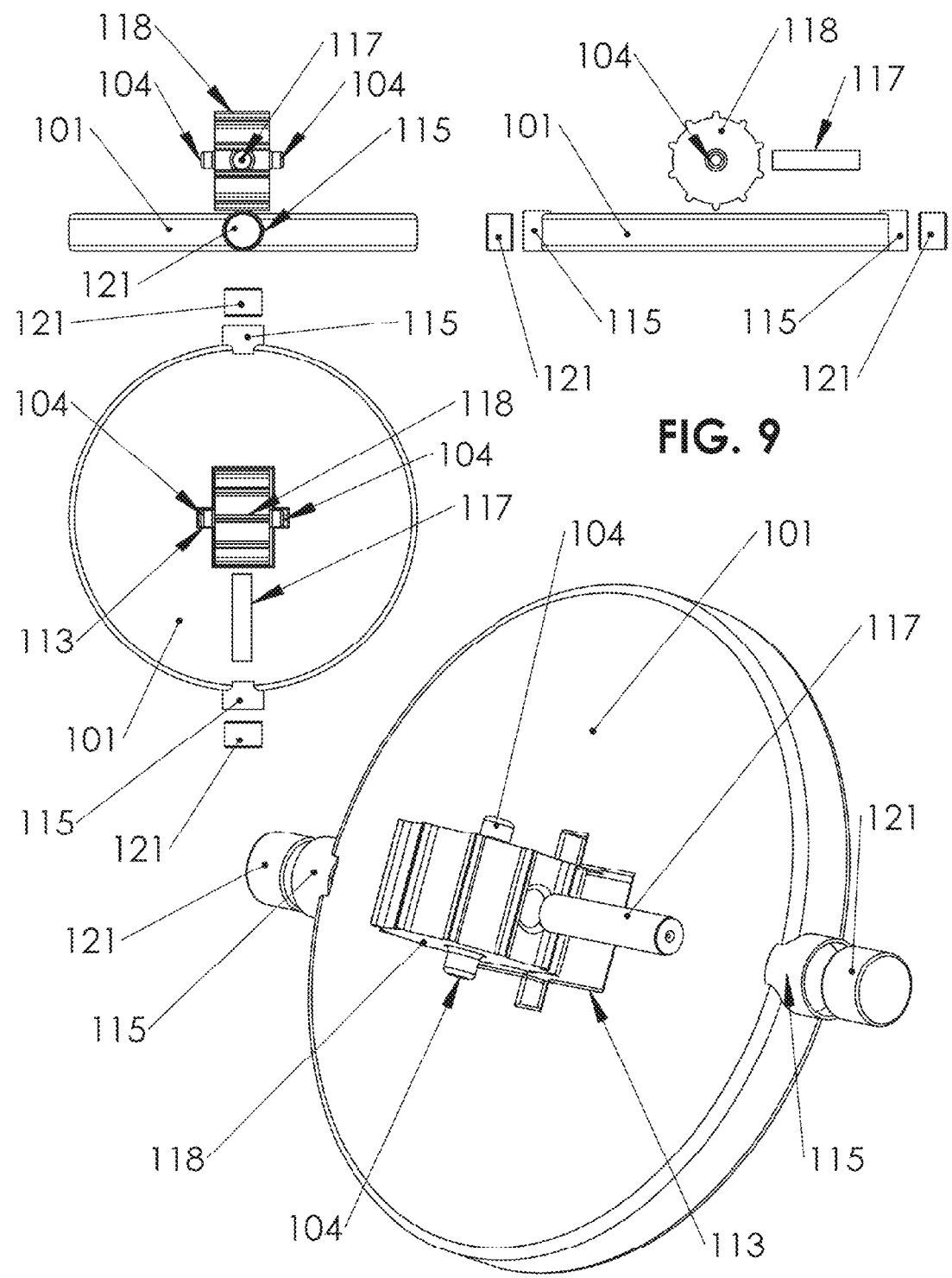
FIG. 9 are elevation, plan and perspective views of a further alternate shows detail of the cylinder bar magnet wheel embodiment disposed above the coil-wire form.

FIG. 9 is an exploded multi-view of another advantageous embodiment of the present invention, whereby a centered axle wheel 118 designed with a single centered through hole that is perpendicular to the axle 103 and is of such diameter to accommodate an be in communication with a cylindrical magnet 117 and where cylindrical magnet 117 has its North and South poles at the end planes of the cylinder magnet 117. As the wheel 118 is rotated the cylinder magnet 117, contained within the centered through hole, moves in a continuing circular path, with the perpendicular magnetic lines of force of the cylindrical magnet 117 cutting through the coil-wire form and establishing an instant induced voltage for any useful purpose. The focus magnet inset well(s) 115 hold stationary the focus magnet(s) 104 in place. The centered axle serrated wheel 118 is inserted in axle well 114 and is free to rotate through the four sided opening 113.

FIG. 10 graphically illustrates 1G the mathematical dot product of the stationary coil-wire form 101 and the rotational spherical magnet 102 or centered axle wheel 118 and 120 shown in previous figures above. The resultant value, which is a scalar quantity that indicates the reference North pole of the associated rotational magnet in question. Vector (A) represents the stationary coil-wire form 102 and Vector (B) represents the rotated North pole position of either:

the all magnetic rare earth (neodymium) spherical magnet 102, hybrid spherical magnet of non-magnetic material non-metal (polymer) sphere 116 and insert cylinder magnet 117, the non-magnetic material non-metal (polymer) centered axle serrated wheel 120 and a plurality of insert cylinder magnets 121, and the non-magnetic material non-metal (polymer) centered axle serrated wheel 118 and insert cylinder magnet 117. Further illustrated 2G is the dot product of A and B that is C and the cross product of B and C represents the instantaneous value and polarity of the induced voltage from the interaction of a "centred rotating magnetic field" through the stationary coil-wire form 101.

Figure 11:
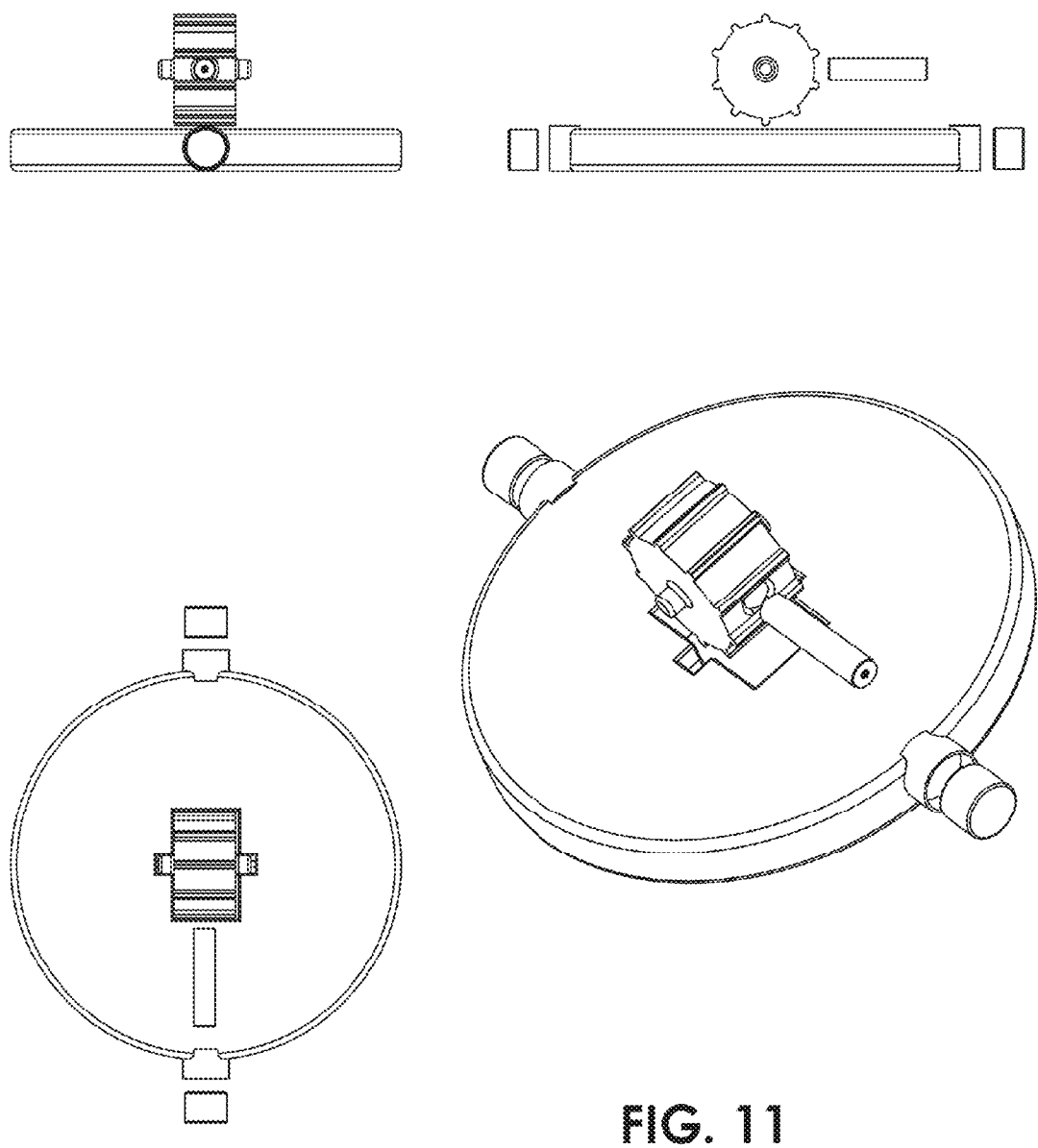
FIG. 11 are elevation, plan and perspective views of a generator assembly having a single cylindrical magnet.

In FIG. 11 an exploded view of the embodiment including a serrated wheel 118 with a cylinder magnet 117 that is inserted into and in communication with the centered through hole 117H that is perpendicular to the axle 103, which is an extrusion of serrated wheel 118. The serrated wheel 118 is inserted into four sided through hole 113 and is in communication with and free to rotate about its centre axis by axle 103, which is inserted into axle well 114 and is in communication with the axle well 114. The magnetic field lines of cylinder magnet 117 are concentrated along the pole path of the cylinder magnet 117 by focus magnet(s) 104 inserted and in stationary communication focus magnet inset(s) 115.

Figure 12:
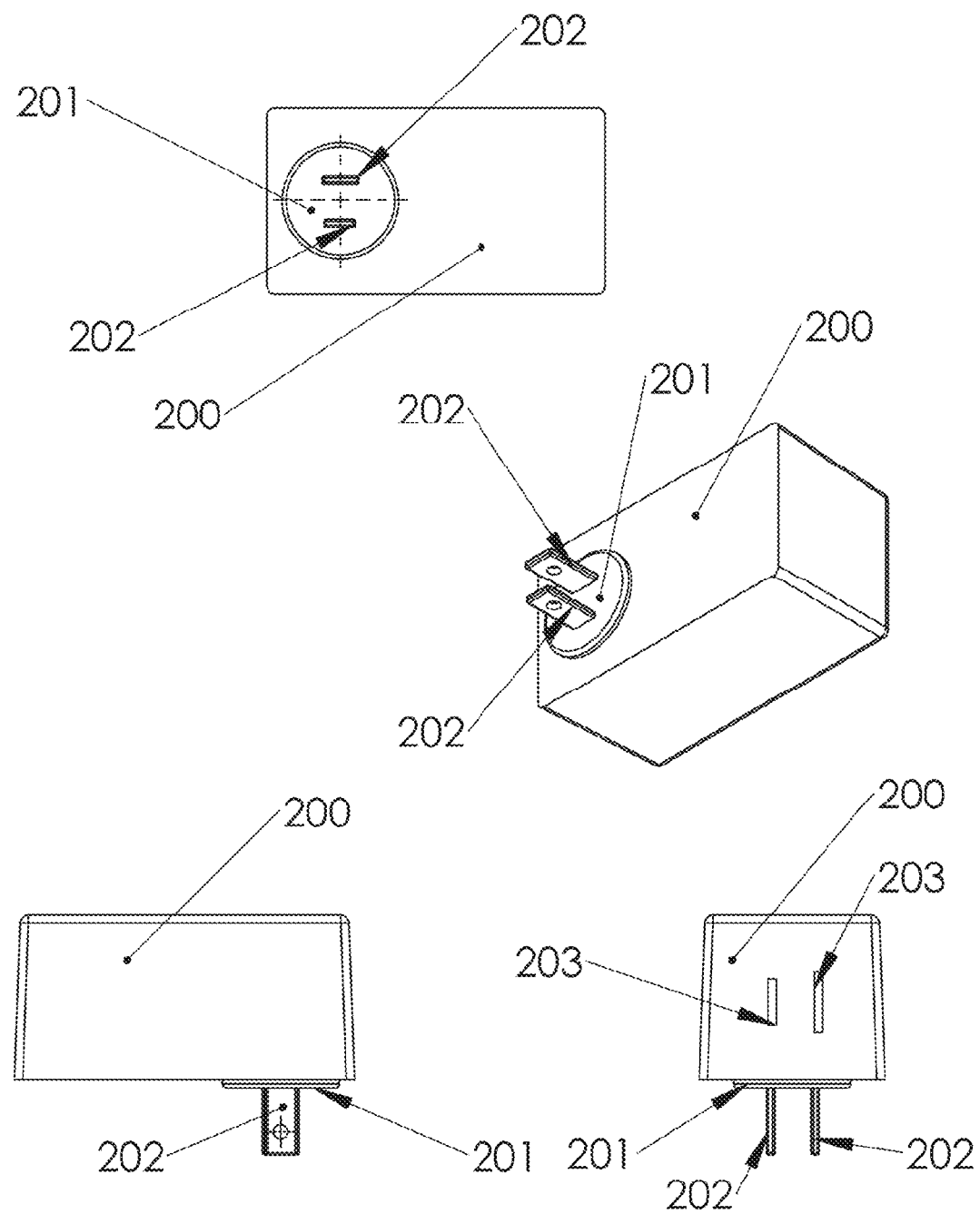
FIG. 12 are elevation, plan and perspective views of a drawing of a typical receiver according to one embodiment of the present invention that is in communication with an AC power source and a control load.

FIG. 12 shows one embodiment of a wireless receiver system 200WR that has its electronic circuitry situated internal to enclosure 200. The operation of the receiver system 200WR is that the receiver system 200WR is powered by an AC power line voltage mains and operates from either 120 or 240 VAC @ 50 or 60 hertz. Connexion to the power line mains is by plug terminals 202 that are in communication with a female AC power line receptacle mains. The plug terminal base 201 that is in communication with plugs 202 can be removed and replaced with various plug terminals to fit foreign AC receptacles. Any AC load such as lights, motors, fans, or any reasonable AC load is plugged into and in communication with AC receptacle inserts 203. The AC load that is plugged into and in communication with the receptacle 203 is then under the influence of electrical switching and dimming control of the receiver and electronic switching and dimming circuitry (not shown, but internal to enclosure 200) is in communication with the AC load to cause on/off switching and dimming of AC electrical power to load. The wireless receiver 200WR receives its control command function from a remote battery-less and wireless transmitter 100A shown in FIG. 2. The action causing load control is by any featured method or means of:

rotating the all magnetic rare earth (neodymium) spherical magnet 102, hybrid spherical magnet of non-magnetic material non-metal (polymer) sphere 116 and insert cylinder magnet 117 combination in common communication with all, or rotating the non-magnetic material non-metal (polymer) centered axle serrated wheel 120 and a plurality of insert cylinder magnets 121 combination in common communication with all, or rotating the non-magnetic material non-metal (polymer) centered axle serrated wheel with a Topological "genus of one" 118 and insert cylinder magnet 117 combination in common communication with all.

Figure 13:
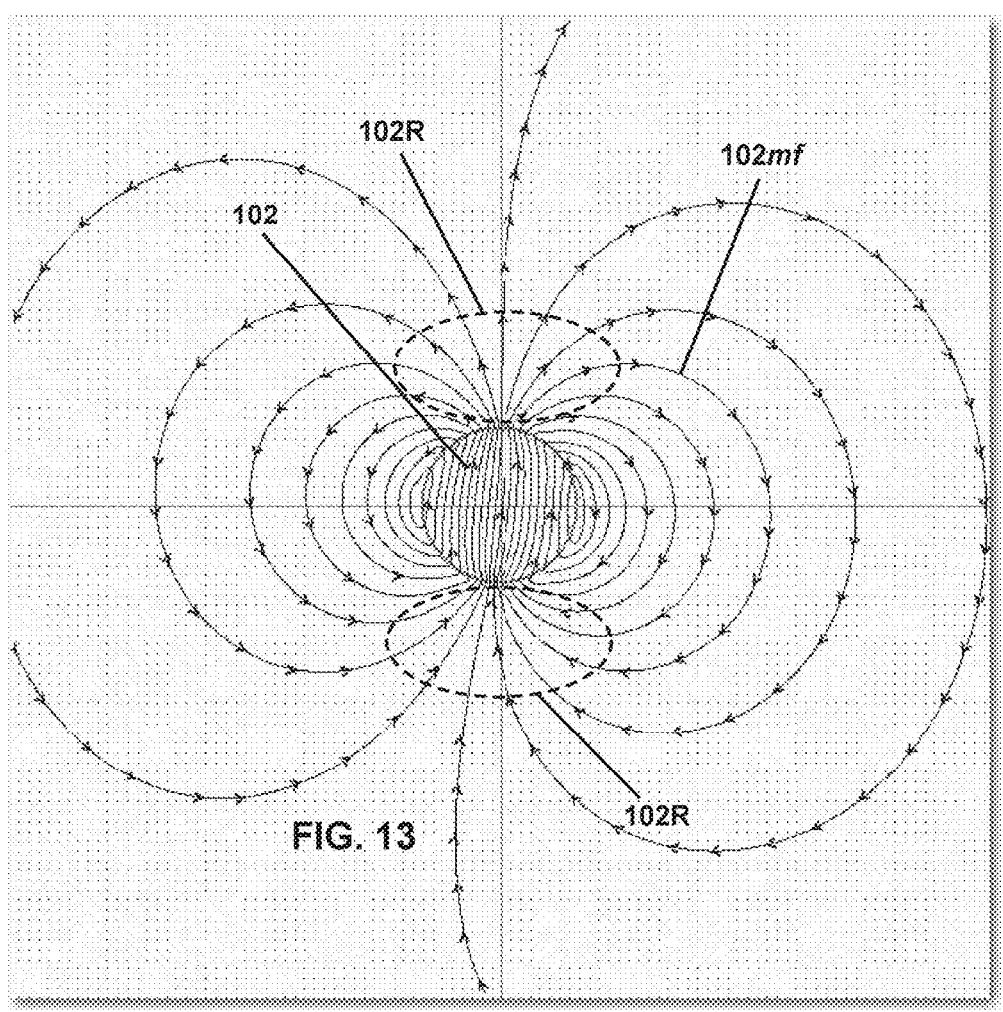
FIG. 13 is a magnetic field line plot of the surrounding magnetic field about a spherical magnet according to one embodiment of the present invention.

An illustration of FIG. 13 shows a typical intrinsic magnetic field embodiment 102mf surrounding a spherical permanent magnet 102. The magnetic lines of force extend outward from the North magnetic pole and enter the South magnetic pole, whereby the magnetic field lines are concentrated at the pole volume 102R. Magnetic field lines of a cylinder magnet will have a similar magnetic line pole path is greatest at the magnetic poles of any magnet.

Figure 14:
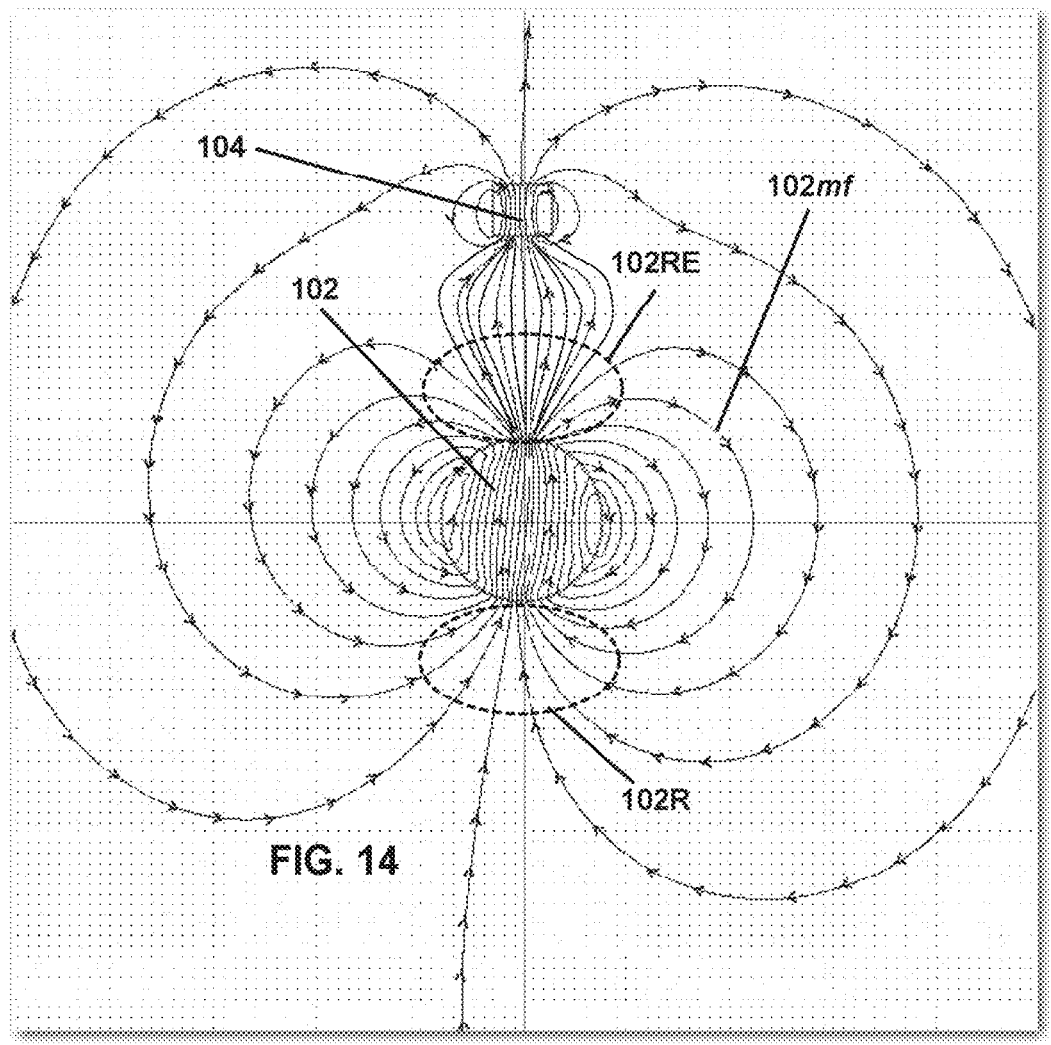
FIG. 14 is a magnetic field line plot of the surrounding magnetic field about a spherical magnet that is under the polar field concentration affects of a polar focusing magnet and its associated magnetic field according to one embodiment of the present invention.

FIG. 14 shows a magnetic field embodiment of a spherical permanent magnet 102 that is under the magnetic influence of an external cylindrical focus magnet 104. The magnetic field intensity of influence varies to the inverse square of the distance from the magnetic pole in question. At the south pole of the spherical magnet 102 the field concentration 102R is intrinsic. At the opposite pole of spherical magnet 102 a cylinder magnet 104 is placed in close proximity of the spherical magnet 102 and is in commutative magnetic attractive pole communication. The action of placing a focus magnet 104 in close proximity to the spherical magnet 102 is to increase the number of magnetic field lines per unit area about a magnetic pole in question. As magnetic field lines (a.k.a. flux lines or flux) are increased, the amount of induced voltage in the coil-wire form 101 in FIG. 2 will increase as the spherical magnet 102 is rotated.

Another embodiment of the present invention as shown in FIG. 15 is for a flat (12 mm thick) wall type battery-less and wireless switch transmitter 300 with a smooth wall or carry about enclosure 301 an having a rocker type flip mechanism for switching on and off a remote AC electrical load such as a lighting fixture, but not limited to a lighting fixture.

Figure 16:
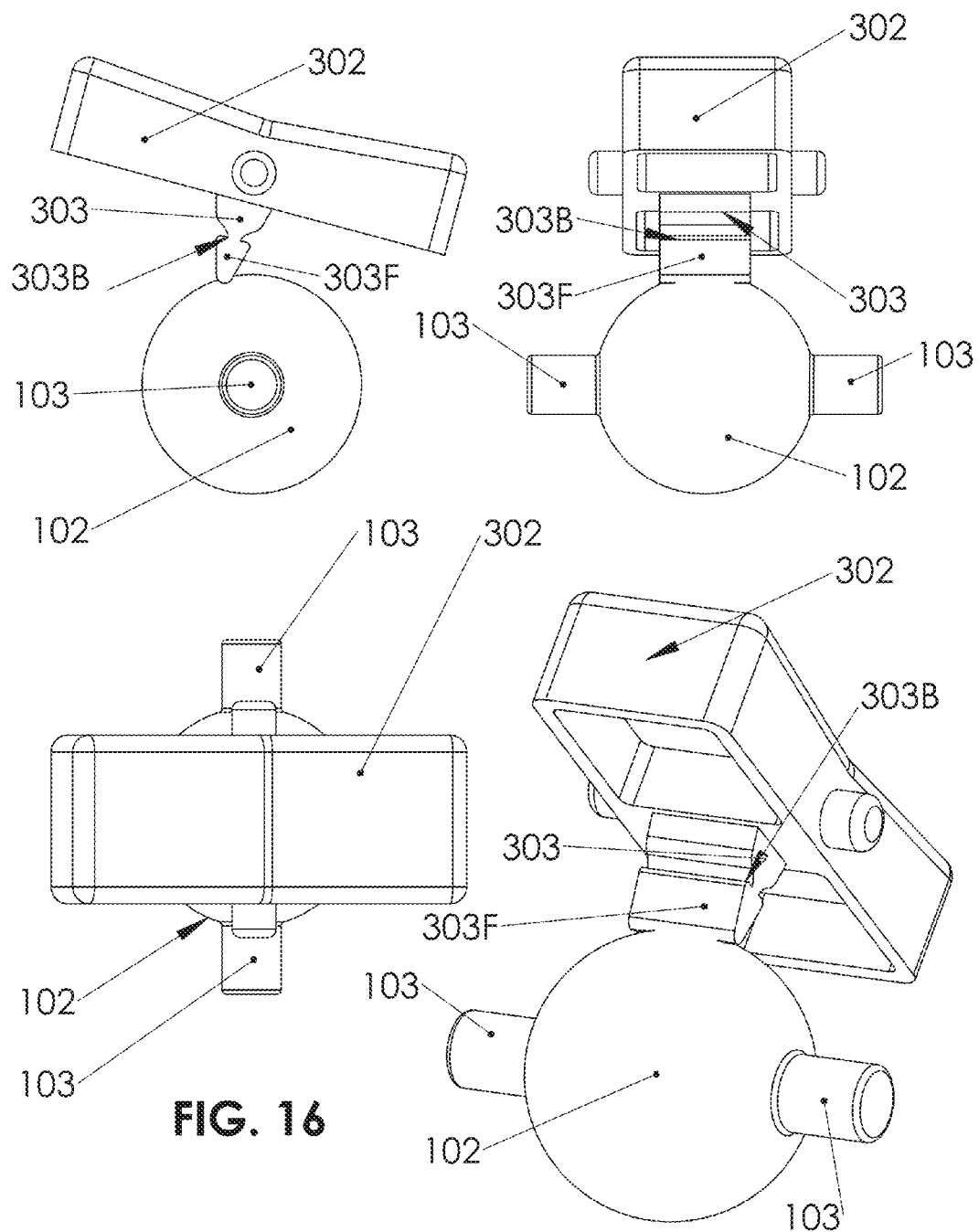
FIG. 16 are elevation, plan and perspective views of a rocker style switch according to an alternate embodiment of the present invention.

Another embodiment in FIG. 16 is a detailed multi-view of a rocker-rotator method 302 in communication with its extruded planar perpendicular axle 304 that is in communication with and utilizes a soft and flexible polymer flip finger 303, 303B, and 303F to initiate and promote rotation of a spherical magnet 102 about its centred axle 103 axis. The flexible flip finger base 303 is in communication with bending notch 303B and flip finger 303F and upon an operator pushing (pressing) the rocker 302 and its consequent flip movement about its axle 304 axis, the flip finger 303F that is in communication with spherical magnet 102 will cause a reaction to spherical magnet and initiate rotation of the spherical magnet in a cyclical direction opposite to the push force direction applied to the rocker 302; likewise the converse action takes place with the opposite side of the rocker 302 is pushed. After the flip finger 303F ends mechanical communication with the spherical magnet 102, the spherical magnet is free to spin for a goodly number of cycles before ceasing rotation due to natural damping frictional forces. This action of the present invention produces enough power from a single flip to generate a voltage level sufficient for several seconds; ample time to power a micro transmitter and send a large amount of encoded digital data to a remote receiver that decodes the data received.

Figure 17:
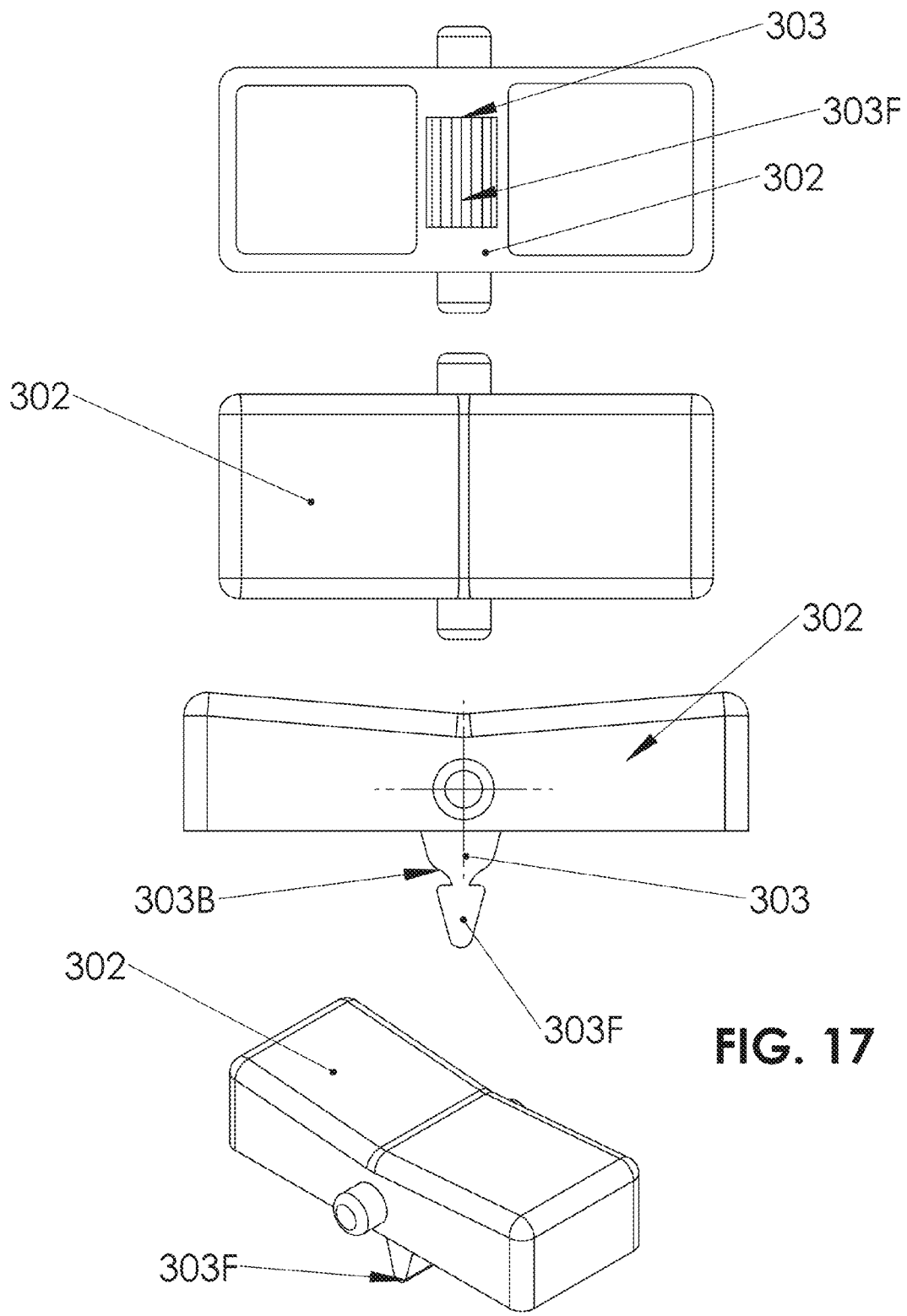
FIG. 17 are elevation, plan and perspective views of the rocker mechanism means with its moveable flip finger mechanism means. according to the embodiment of FIG. 16.

Another embodiment in FIG. 17 shows the rocker 302 that is in communication with its flip finger base 303, its flip finger 303F and the flip finger 303F is bendable in a forward or backward direction by flexible notch section 303B.

Figure 18:
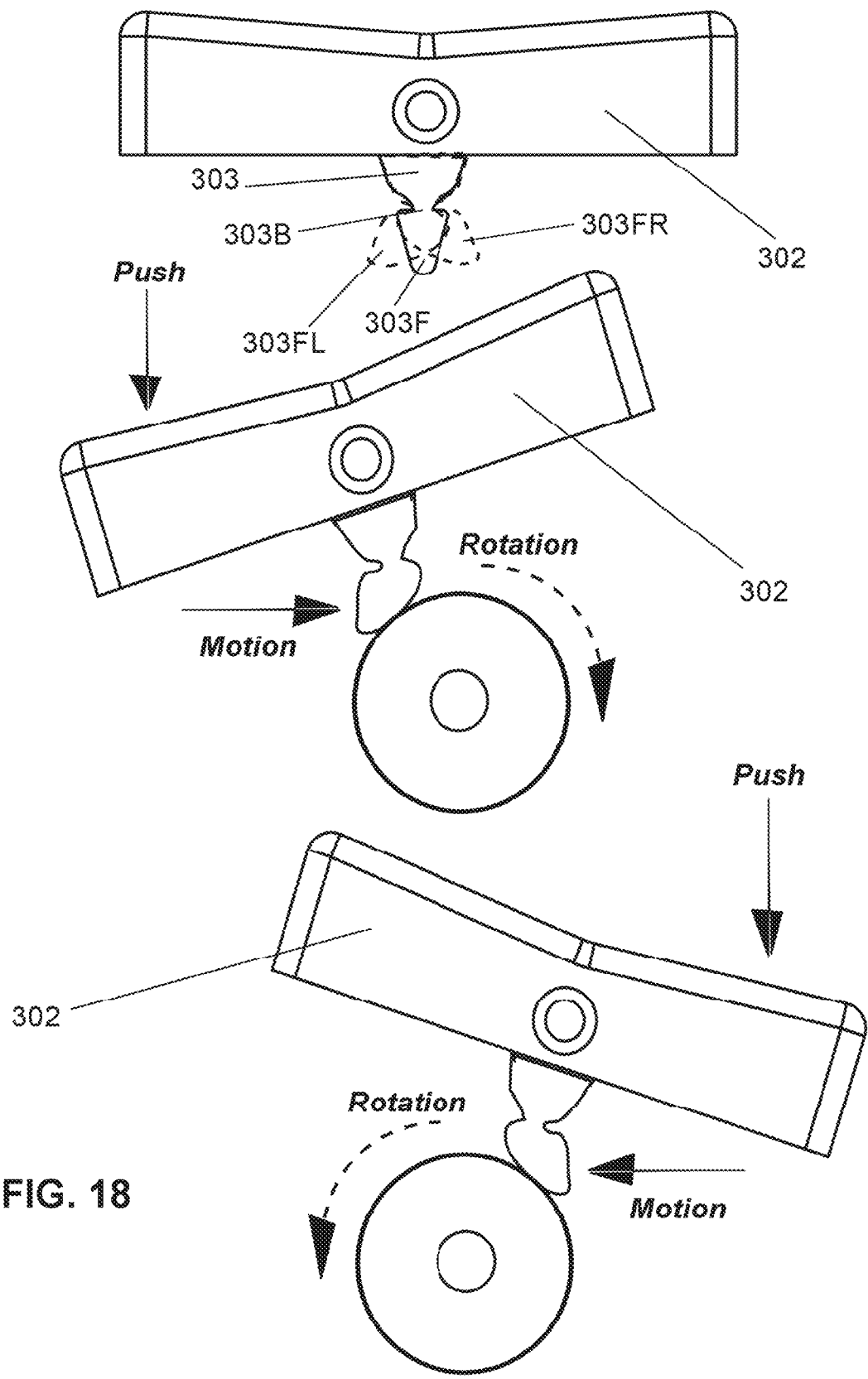
FIG. 18 are a sequence of illustrations showing a "progressive movement" illustration of the rocker flip finger mechanism according to the embodiment of FIG. 16.

The embodiment of the rocker 302 in FIG. 18 shows the action of switch activation by pushing the left side of the rocker 302 that is in communication with flip finger base 303 and whose flip finger 303F is in flexible communication with spherical magnet 102. Further, pushing the rocker causes a bending around finger notch 303B and moves flip finger 303F to move on a leftward position 303FL thus establishing a thrust force on the spherical magnet 102 causing a clockwise rotation of the spherical magnet. Conversely, the embodiment of the rocker 302 in FIG. 18 shows the action of switch activation by pushing the right side of the rocker 302 that is in communication with flip finger base 303 and whose flip finger 303F is in flexible communication with spherical magnet 102. Further, pushing the rocker causes a bending around finger notch 303B and moves flip finger 303F to move on a rightward position 303FR thus establishing a thrust force on the spherical magnet 102 causing an anticlockwise rotation of the spherical magnet.

Figure 19:
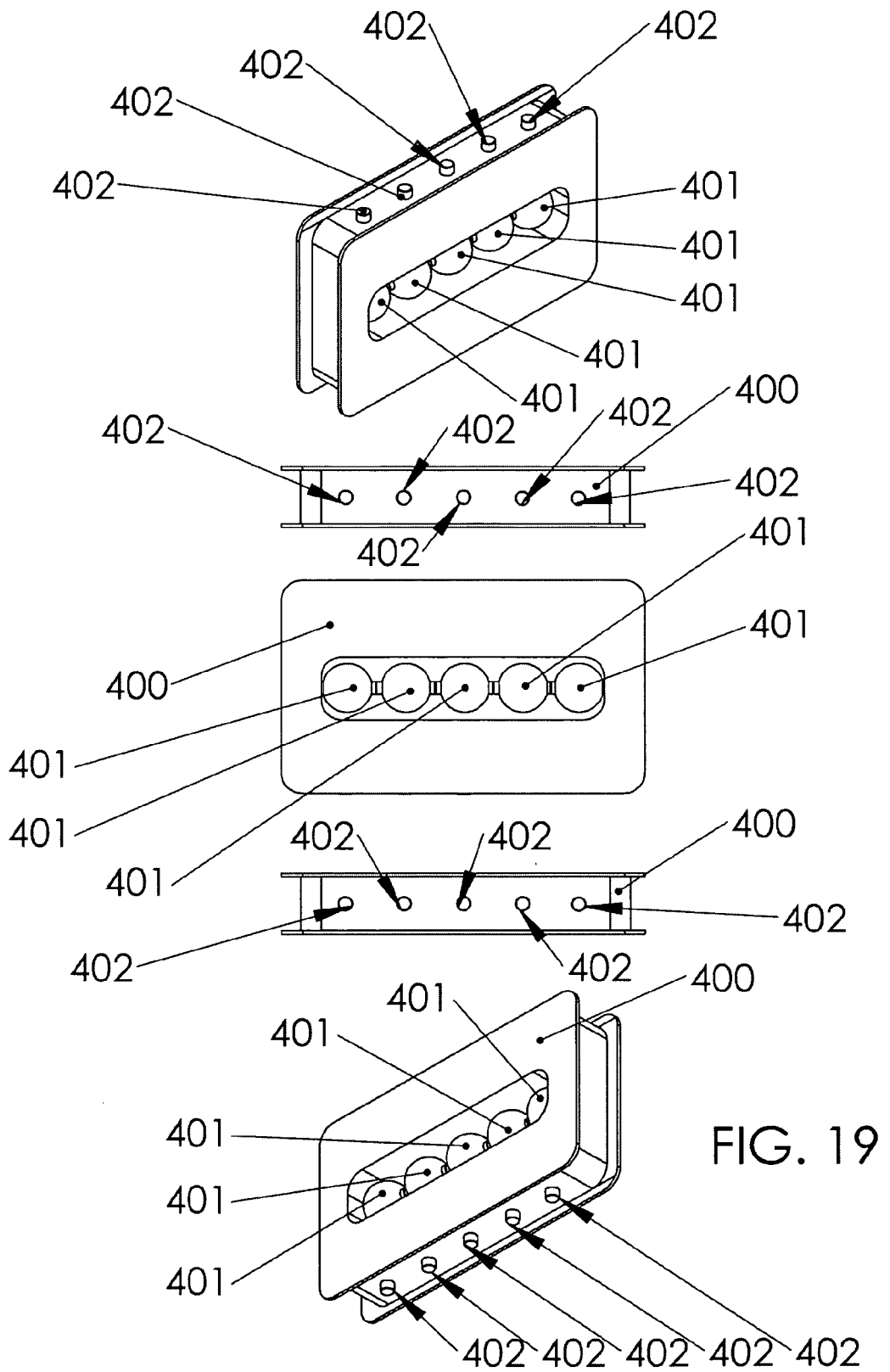
FIG. 19 are elevation, plan and perspective views of an alternate embodiment of the present invention is an example of utilizing a plurality of spherical magnets that are arranged in-line with their respective North and South magnetic poles in parallel.

Another embodiment of the present invention in FIG. 19 utilizes a rectangular shape coil-wire form 400, whereby a centred through hole exists for free movement of rotation of a plurality of spherical permanent magnets 401, and existing about the side of the rectangular coil-wire form is disposed a dual series plurality of focus magnet 402. Each the focus magnet pair 402 have their magnetic lines of force in-line and disposed in an attractive state relative to each one of the plurality of spherical permanent magnets 401.

Figure 20:
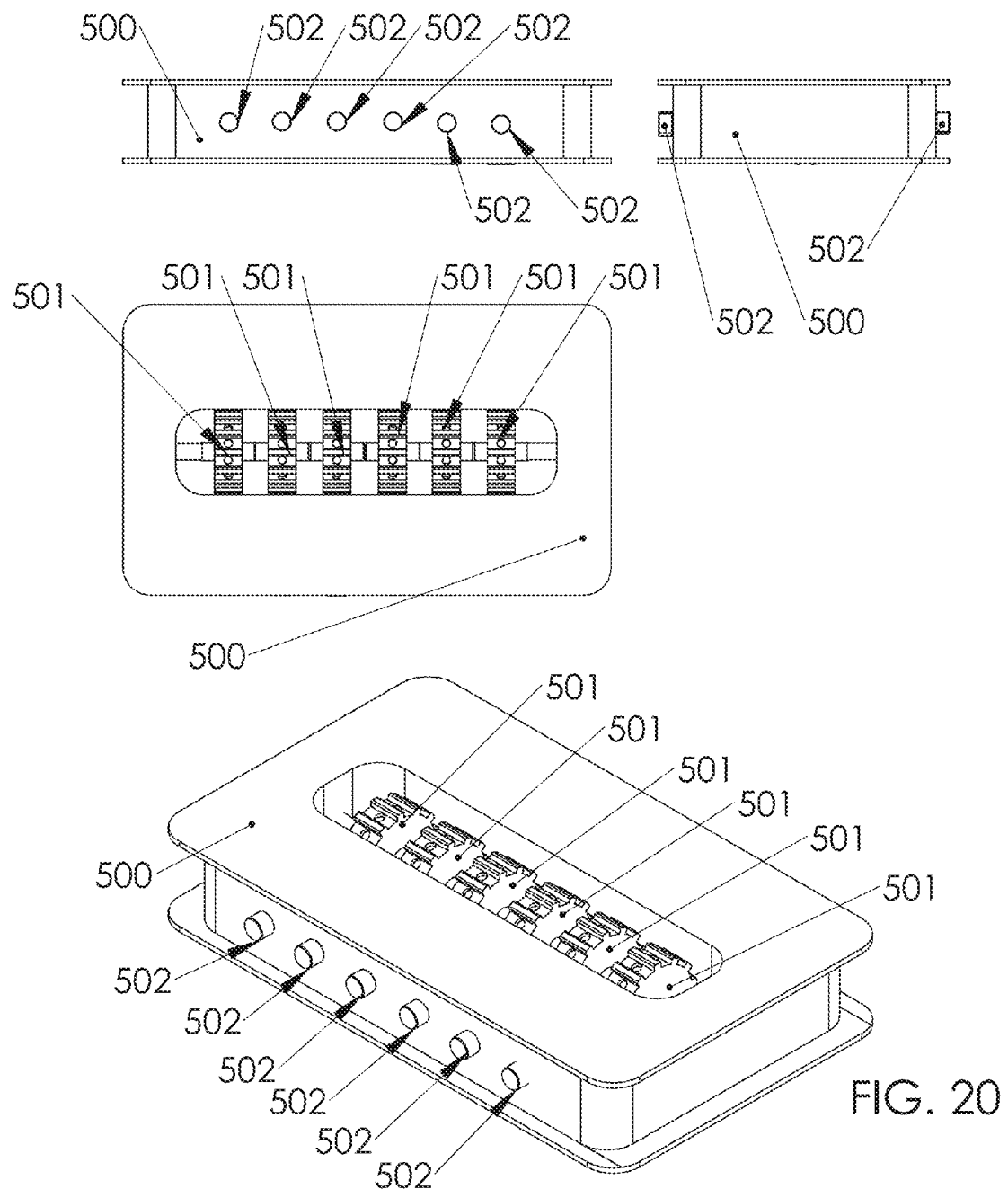
FIG. 20 are elevation, plan and perspective views of an alternate embodiment of the present invention including a plurality of serrated wheels each having a plurality of centred cylindrical permanent magnets.

Another embodiment of the present invention in FIG. 20 utilizes a rectangular shape coil-wire form 500, whereby a centred through hole exists for free movement of rotation of a plurality of serrated wheels 501, and existing about the side of the rectangular coil-wire form is disposed a dual series plurality of focus magnet 502. Each the focus magnet pair 502 have their magnetic lines of force in-line and disposed in an attractive state relative to each one of the plurality of serrated wheels with a plurality of centred blind hole insets on a serrated wheel to accommodate a plurality of cylindrical magnets 121.

Figure 21:
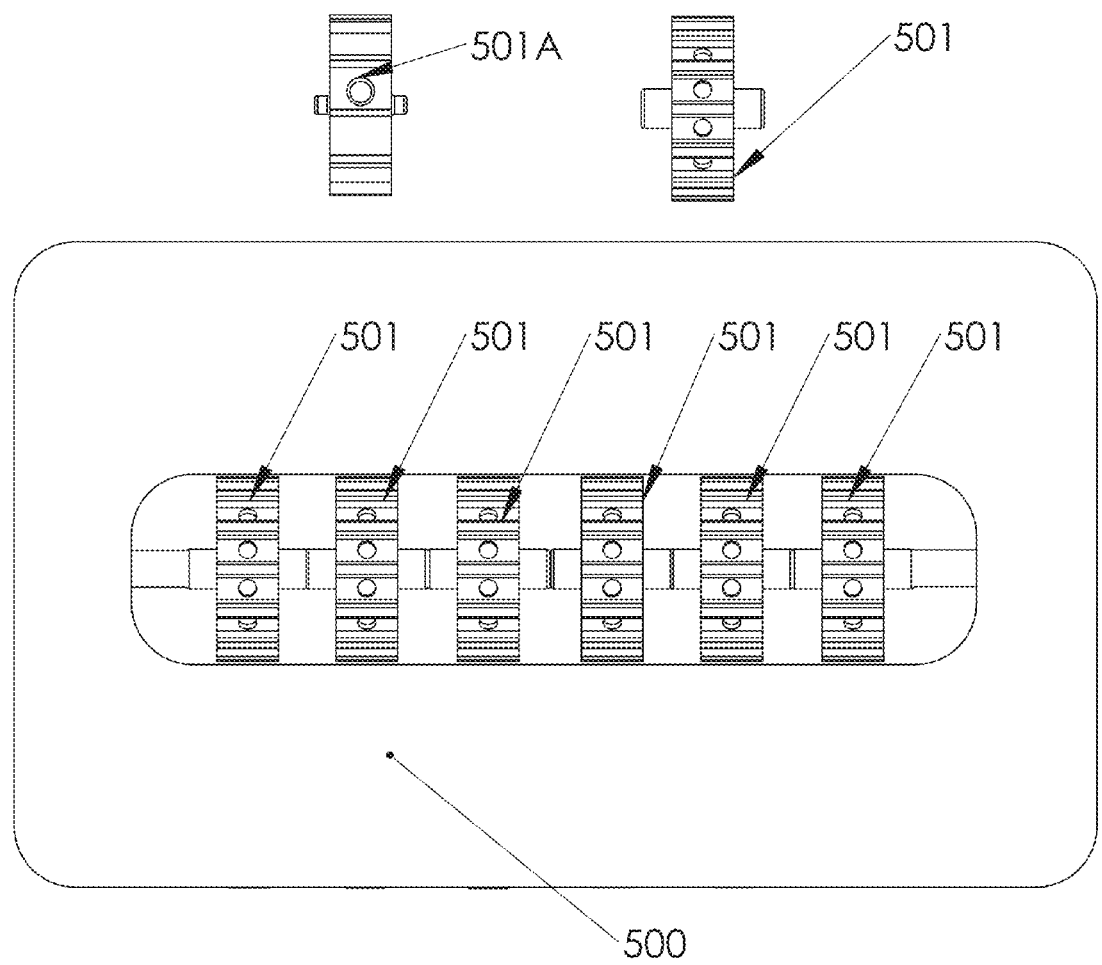
FIG. 21 are plan views of a further embodiment of a serrated wheel generator with said rectangular coil-wire form and an array of serrated wheels.

Another embodiment of the present invention in FIG. 21 utilizes a rectangular shape coil-wire form 500 that is of a Topological genus of one, whereby a centred through hole exists for free movement of rotation of a plurality of serrated wheels 501, and existing about the side of the rectangular coil-wire form is disposed a dual series plurality of focus magnet 502 (not visible in drawing). Each the focus magnet pair 502 (not visible in drawing) have their magnetic lines of force in-line and disposed in an attractive state relative to each one of the plurality of serrated wheels 501 with a plurality of centred blind hole insets on a serrated wheel to accommodate a plurality of cylindrical magnets 121, or each the focus magnet pair 502 (not visible in drawing) have their magnetic lines of force in-line and disposed in an attractive state relative to each one of the plurality of serrated wheels 501A and each with a centred through hole on a serrated wheel to accommodate a single cylindrical permanent magnet 117.

Figure 22:
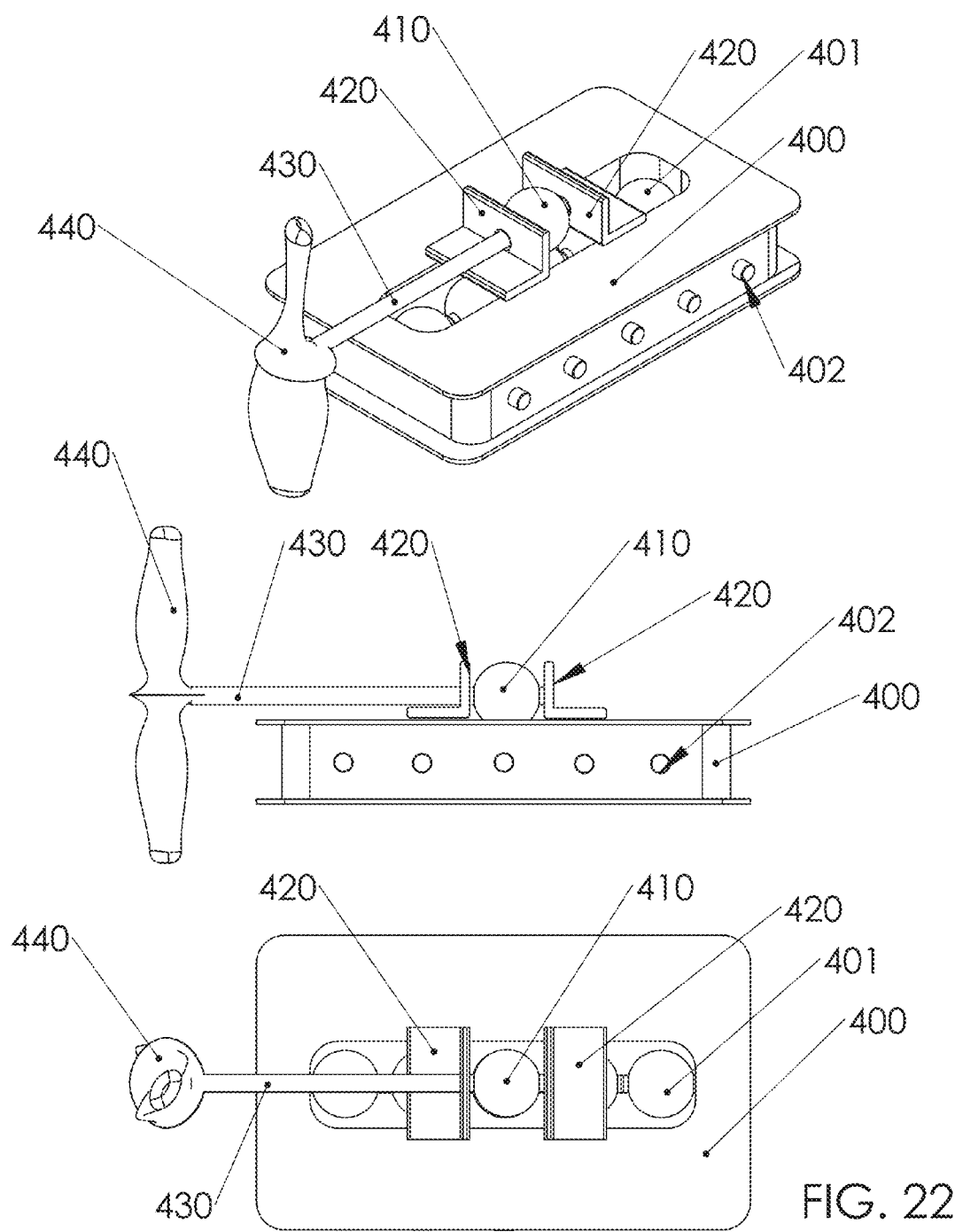
FIG. 22 are elevation, plan and perspective views of a further alternate embodiment of the present invention including a spherical magnet drive mechanism.

Another embodiment of the present invention in FIG. 22 where a 360 degrees of freedom rotatable propeller 440 is in communication with a 360 degrees of freedom rotatable drive shaft 430 that is in turn in communication with a 360 degrees of freedom rotatable Gaussian spherical form drive gear 410 having two axles that are supported by two stationary mounting brackets 420 where at least one axle component is in communication with the drive shaft 430 and the remaining axle is in communication with mounting bracket 420.

Figure 23:
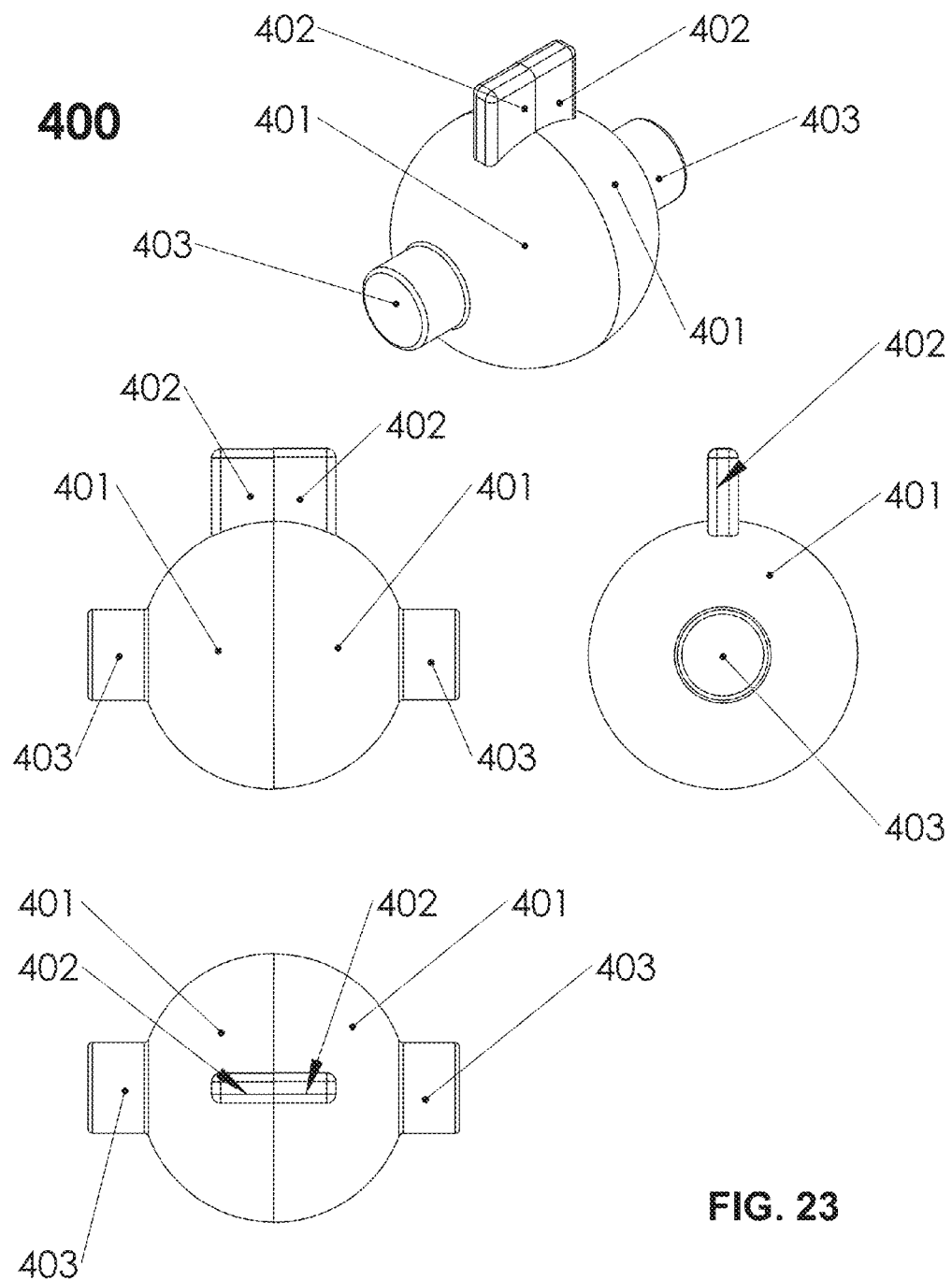
FIG. 23 are elevation, plan and perspective views of an alternate embodiment of the present invention including a spherical magnet cap enclosure with flip tab.

A separate embodiment associated with the present invention in FIG. 23 of an axial encapsulation tabbed magnet shell 400 that is comprised of two halves, where each half shell component has a hollow hemisphere 401 with a tangent protruding axle 403 and a flip tab half 402 tangent to the hemisphere 401 and positioned at its outer rim; and when the two halves are combined, they form a complete hollow encapsulation 400 for enclosing a spherical permanent magnet.

Figure 24:
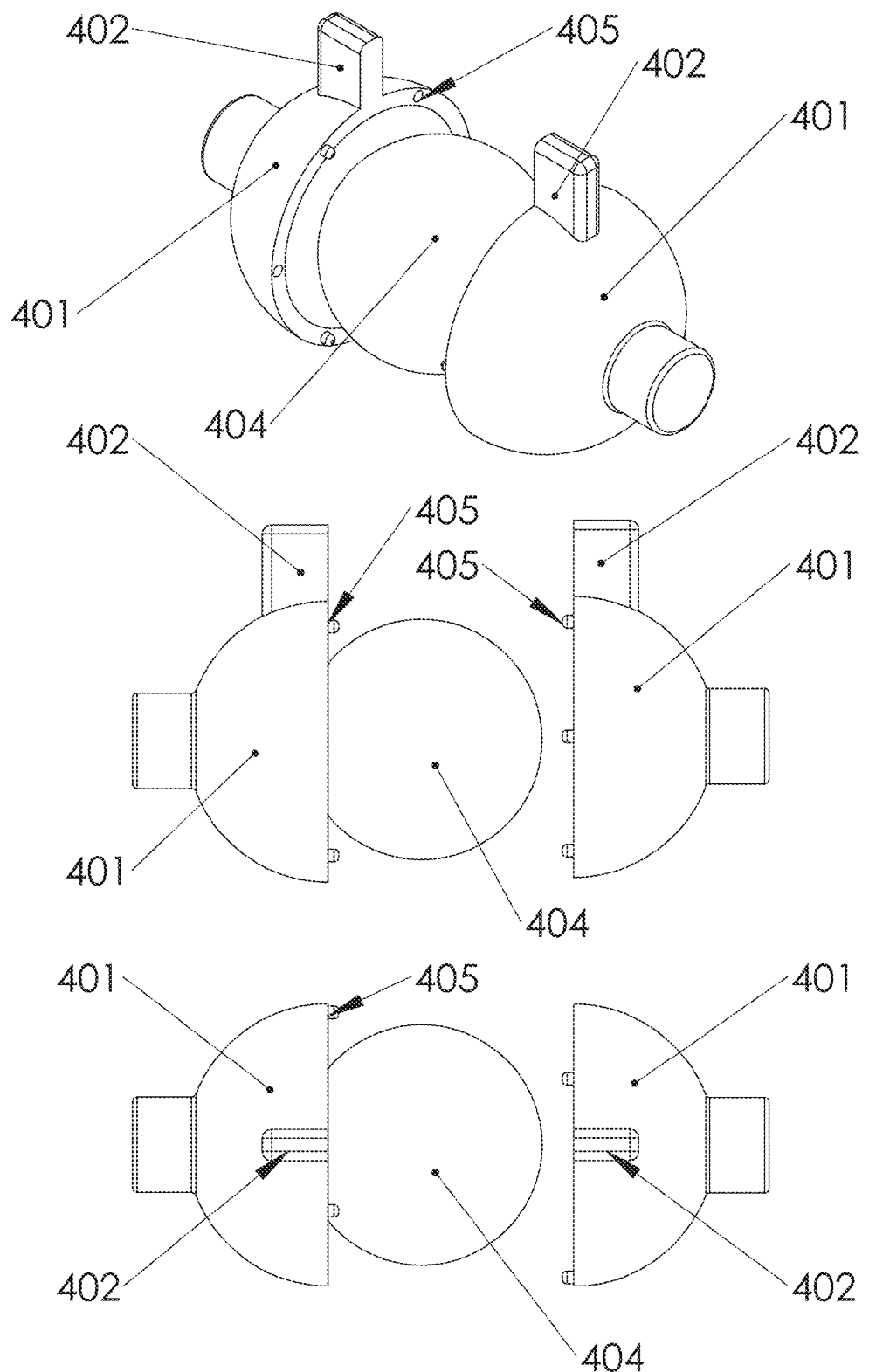
FIG. 24 are elevation, plan and perspective views of the embodiment of FIG. 23 of the present invention showing a spherical magnet being disposed within spherical magnet cap enclosure.

Another embodiment of the present invention in FIG. 24 illustrates the insertion of the spherical magnet 404 and is disposed into each half of the hollow hemisphere 401 with the tangent protruding axle 403 and the flip tab half 402 tangent to the hemisphere 401 and positioned at its outer rim. The flip tab halves are locked inline to each other by a plurality of keyed synchronized male nubs 405 and female nub receptors 405.

Figure 25:
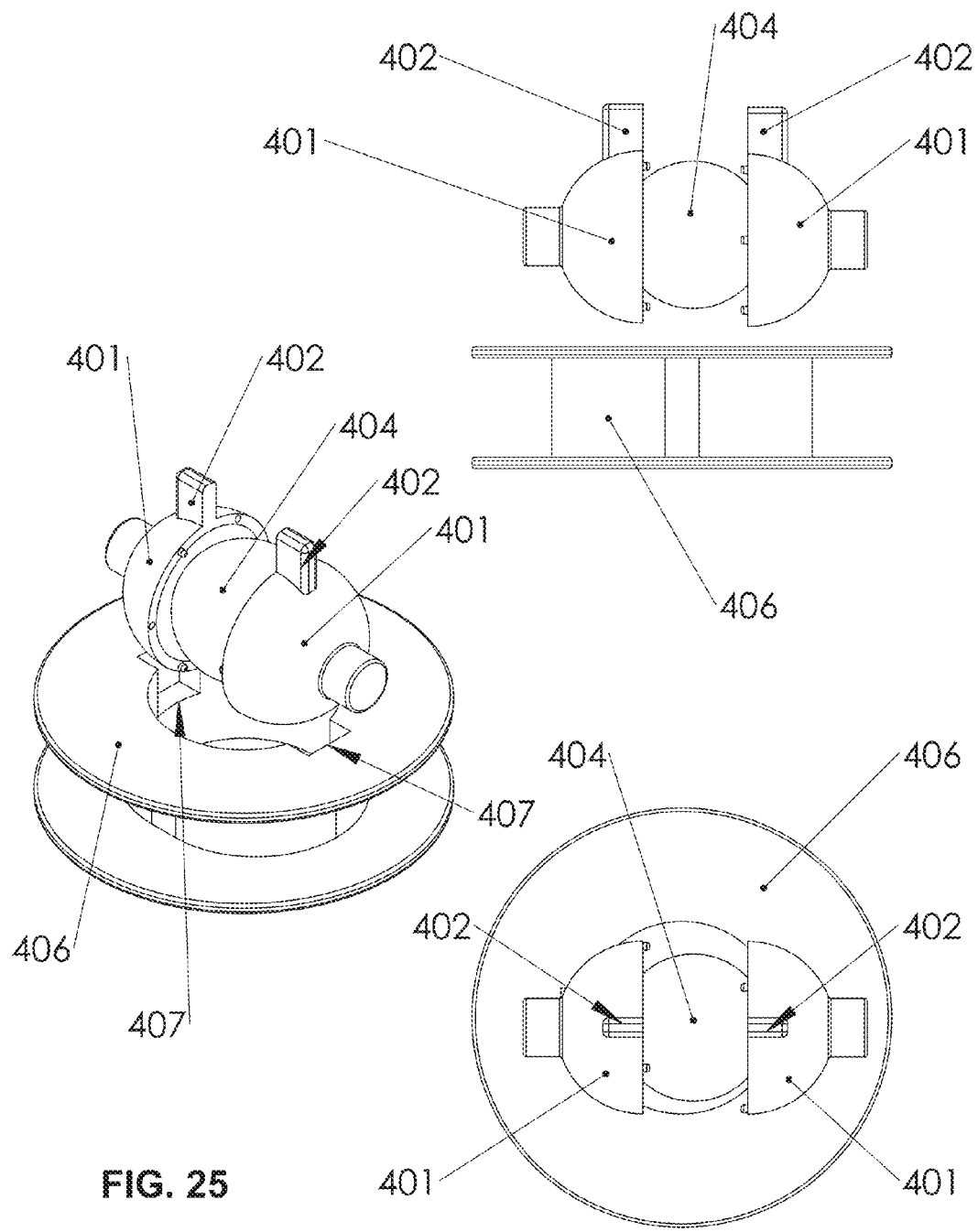
FIG. 25 are elevation, plan and perspective views of the embodiment of FIG. 23 of the present invention showing the spherical magnet and its enclosure.

Another embodiment of the present invention in FIG. 25 shows the magnet enclosure comprised of two halves of the hollow hemisphere 401 with the tangent protruding axle 403 and the flip tab half 402 tangent to the hemisphere 401 and positioned at its outer rim and the coil bobbin 406 of which a plurality of sufficient enameled copper wire turns are wound around the coil bobbin 406 to create an electric coil that will generate electrical energy during any movement of magnet enclosure assembly 400 that is further disposed into the coil bobbin 406. The magnet enclosure assembly 400 has its axle components fitted and disposed in coil bobbin axle wells 407 and further the enclosure axle component 403 are free and unrestricted to rotate within the axle wells 407.

Figure 26:
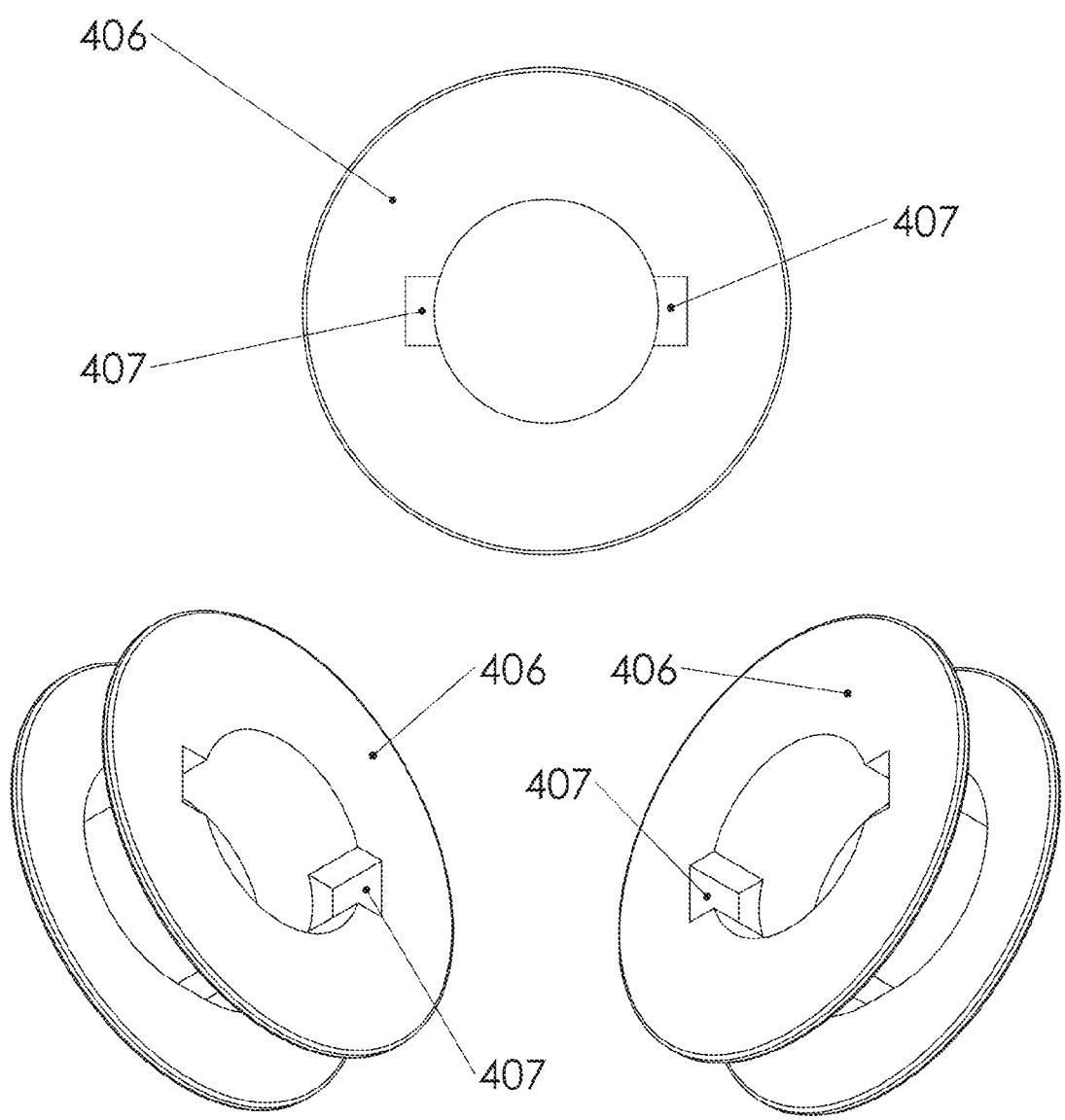
FIG. 26 are elevation, plan and perspective views of the embodiment of FIG. 24 of the present invention showing the coil bobbin means with its axle wells.

Another embodiment of the present invention in FIG. 26 shows the coil bobbin 406 and its axle wells 407 for containing a set of axles.

Figure 27:
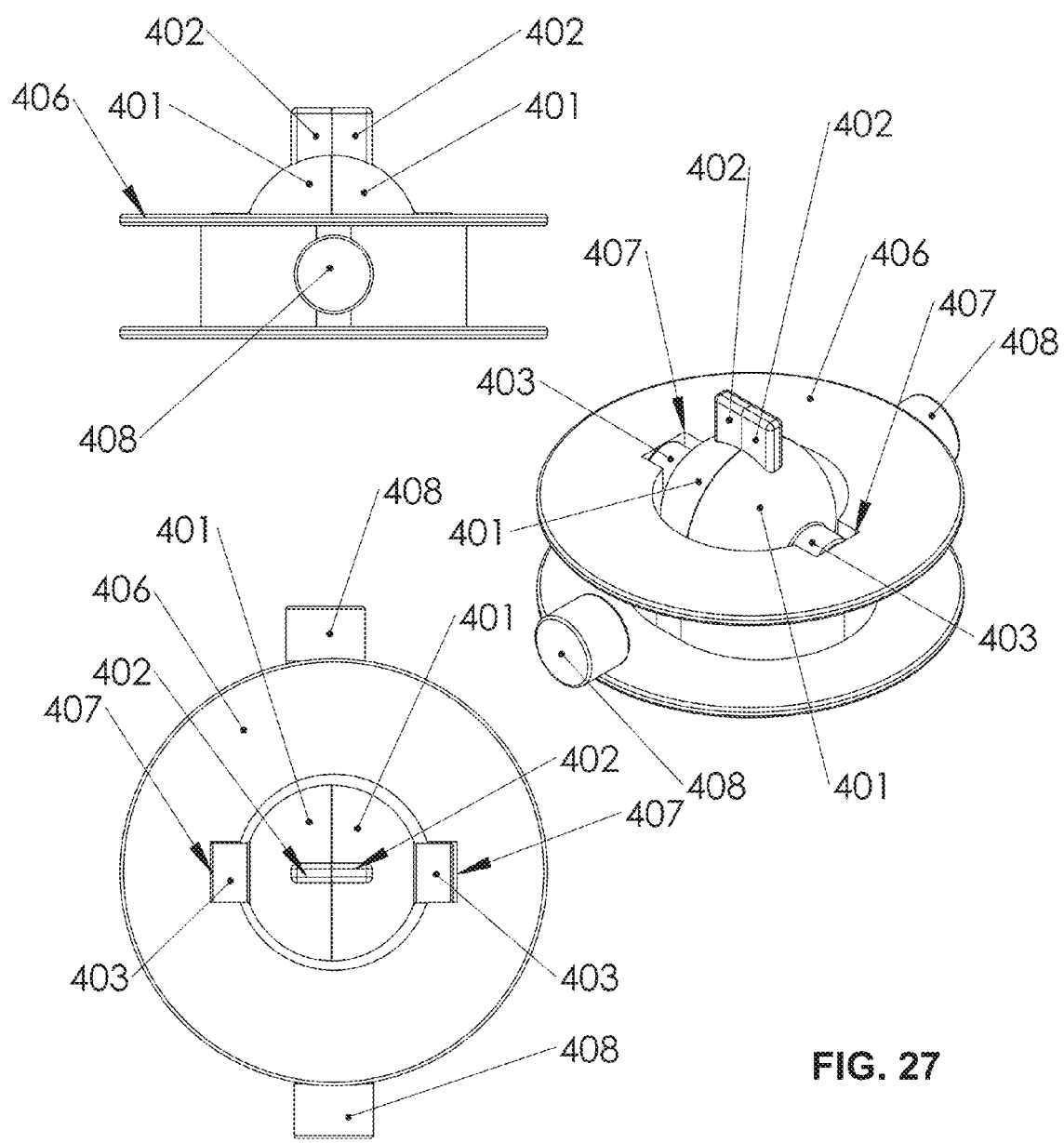
FIG. 27 are elevation, plan and perspective views of the embodiment of FIG. 25 of the present invention showing assembly of the magnet cap into the coil bobbin.

Another embodiment of the present invention in FIG. 27 shows the functional energy harvesting generator that is comprised of spherical magnet enclosed within the enclosure 400 comprised of hollow spherical cap 401 with tangent axles 403 and the flip tab 402 whereby the magnet enclosure 400 is inserted and free to rotate within the coil bobbin axle wells 407 as member to coil bobbin 406; for the purpose of generating electrical energy.

Figure 28:
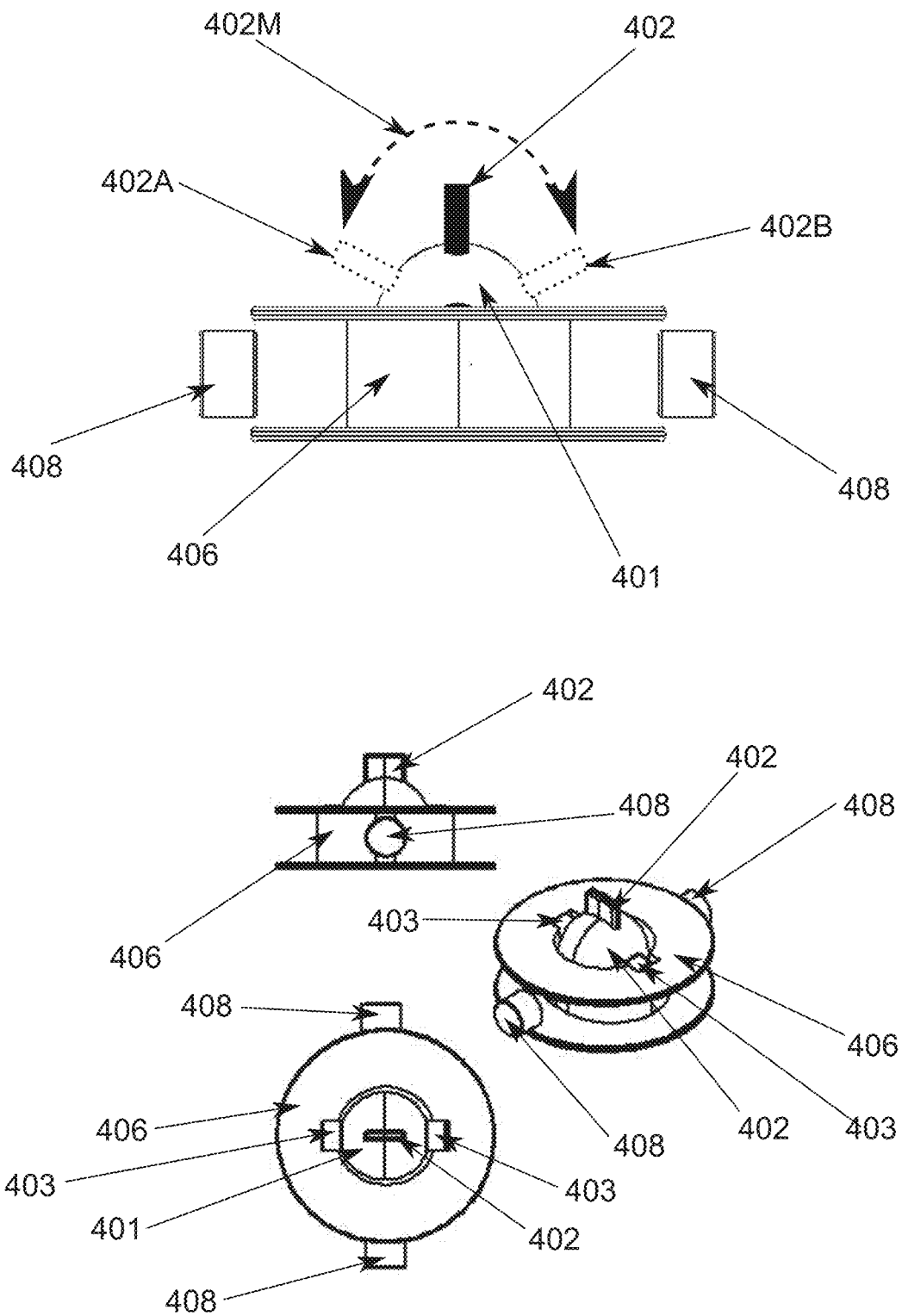
FIG. 28 are elevation, plan and perspective views of the embodiment of FIG. 25 of the present invention illustrating a two way flip operation of said spherical magnet enclosure according to the present invention.

Another embodiment of the present invention in FIG. 28 illustrates the flip action of the energy harvesting generator whereby the enclosure 400 comprised of hollow spherical cap 401 with tangent axles 403 and the flip tab 402 remains moveable (flappable) in a forward and reverse motion, and whereby the motion causes the enclosed spherical magnet to move and with this movement consequently it ambient residual magnetic field. There are disposed a plurality of focus magnets 408 that are aligned and disposed along the sides of the coil 406 in such a manner as to have their corresponding magnetic fields aligned inline, and facing North pole to South pole so as to provide a magnetic force field that will keep the magnet enclosure 400 and consequently its flip tab positioned centre vertical 402, but not restricted to centre vertical and is free to flip in an angular forward 402A or reverse 402B direction and due to the inline attractive magnetic field established by the focus magnets 408. This action of the inline focus magnets 408 with their inherent magnetic fields established a spring action that causes a damped oscillatory motion and consequently a damped alternating current within the coil wire that is wound around the coil bobbin 406.

Figure 29:
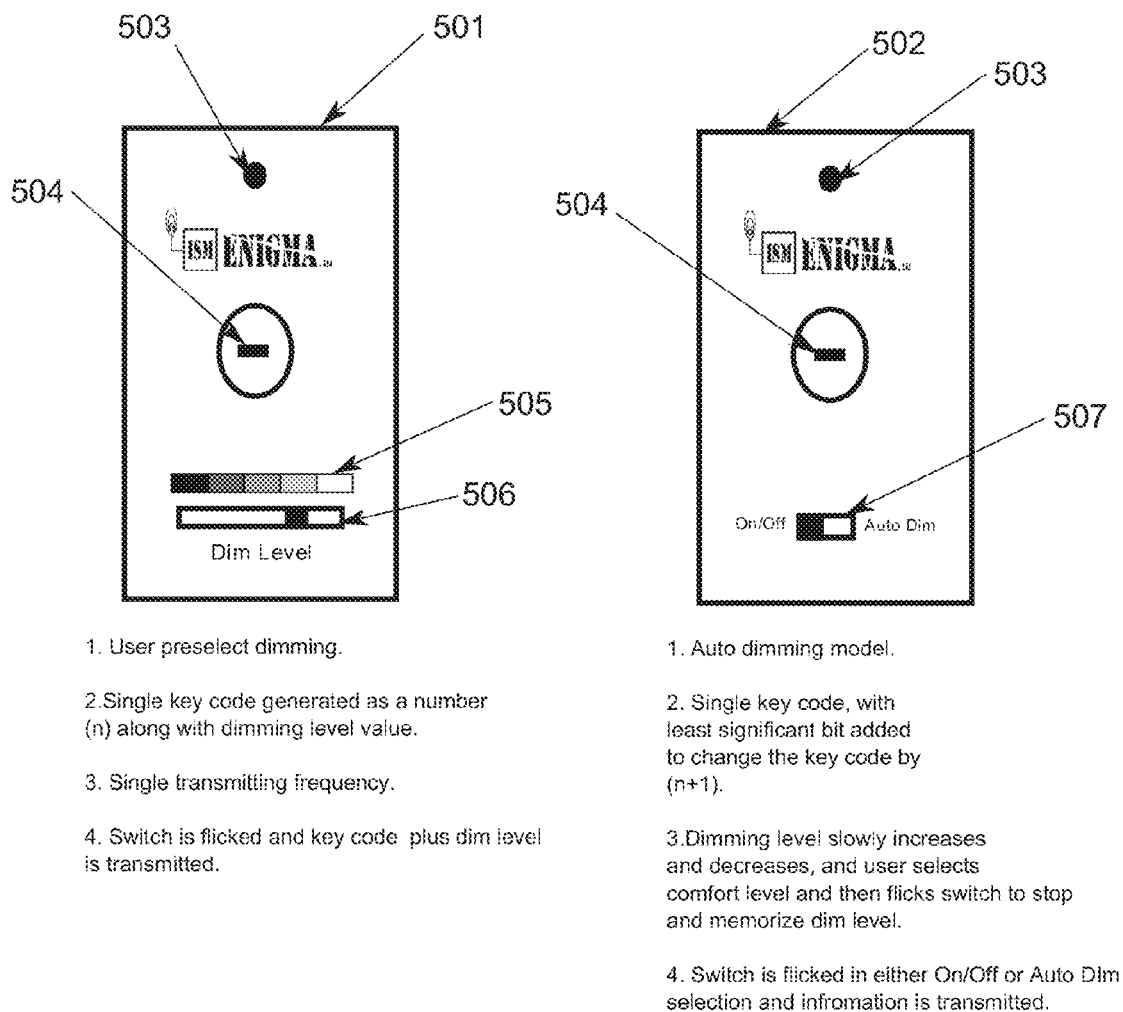
FIG. 29 are elevation views of two different embodiments including controls for light dimming.

Another embodiment of the present invention in FIG. 29 illustrates two different battery-less, powered by the energy harvesting generators 500 and International ISM Band wireless electrical remote power switch with the dimming features. Model 501 is of the configuration model having an indicator LED 503, a flip tab control 504, a dimmer potentiometer 506 with grey scale level graph 505. Wherein as flip tab 504 is moved by a consumer in either an up or down flipping motion, the indicator LED 503 blinks momentarily indicating that the unit is generating power for its internal ISM Band transmitter that has a single frequency of a possible plurality of designated approved and licensed ISM Band of frequencies for International operation; and dim level that has been set is sent along with a permanent key code that is instantly established upon an initial flip tab 504 operation. A designated receiver with same key code and frequency receives the ON/OFF information and fixed dime level established by the setting of the transmitter potentiometer, and further the receiver is electrically connected in series with an electrical load such as a lighting fixture, but not limited to a lighting fixture; in general any electrical load within the receiver's power load capabilities that can be a plurality of levels dependent on model type. Model 502 is of the configuration model having an indicator LED 503, a flip tab control 504, and a slide switch 507 that allows an ON/OFF position and a dimming position. When the slide switch 507 is in the ON/OFF position, the flip tab 504 is moved by a consumer in either an up or down flipping motion, the indicator LED 503 blinks momentarily indicating that the unit is generating power for its internal ISM Band transmitter that has a single frequency of a possible plurality of designated approved and licensed ISM Band of frequencies for International operation; and a permanent key code is instantly established upon an initial flip tab 504 operation and transmitted. A designated receiver with same key code and frequency is electrically connected in series with an electrical load such as a lighting fixture, but not limited to a lighting fixture; in general any electrical load within the receiver's power load capabilities that can be a plurality of levels dependent on model type. After a light or any designated electrically connected load is turned on, if the slide switch 507 is moved into its Auto Dim mode position another flick of the flip tab 504 send a different code via the same single transmitter and frequency to the designated receiver where an auto dimming feature is triggered into operation. The dimming feature now, is of the type that allows for a continuous slow oscillating of the brightness or power level to increase and decrease periodically, thus giving a consumer time to decide what level is suited for the occasion. Once a level is decided, another flick of the tab cause the dim level to be memorized and constant in the decided level of power or brightness. Any future dimming choices can be made by a consumer simply be re-flicking the flip tab 504 and observing the slow undulations of brightness levels for a new choice of dimming level.

Figure 30:
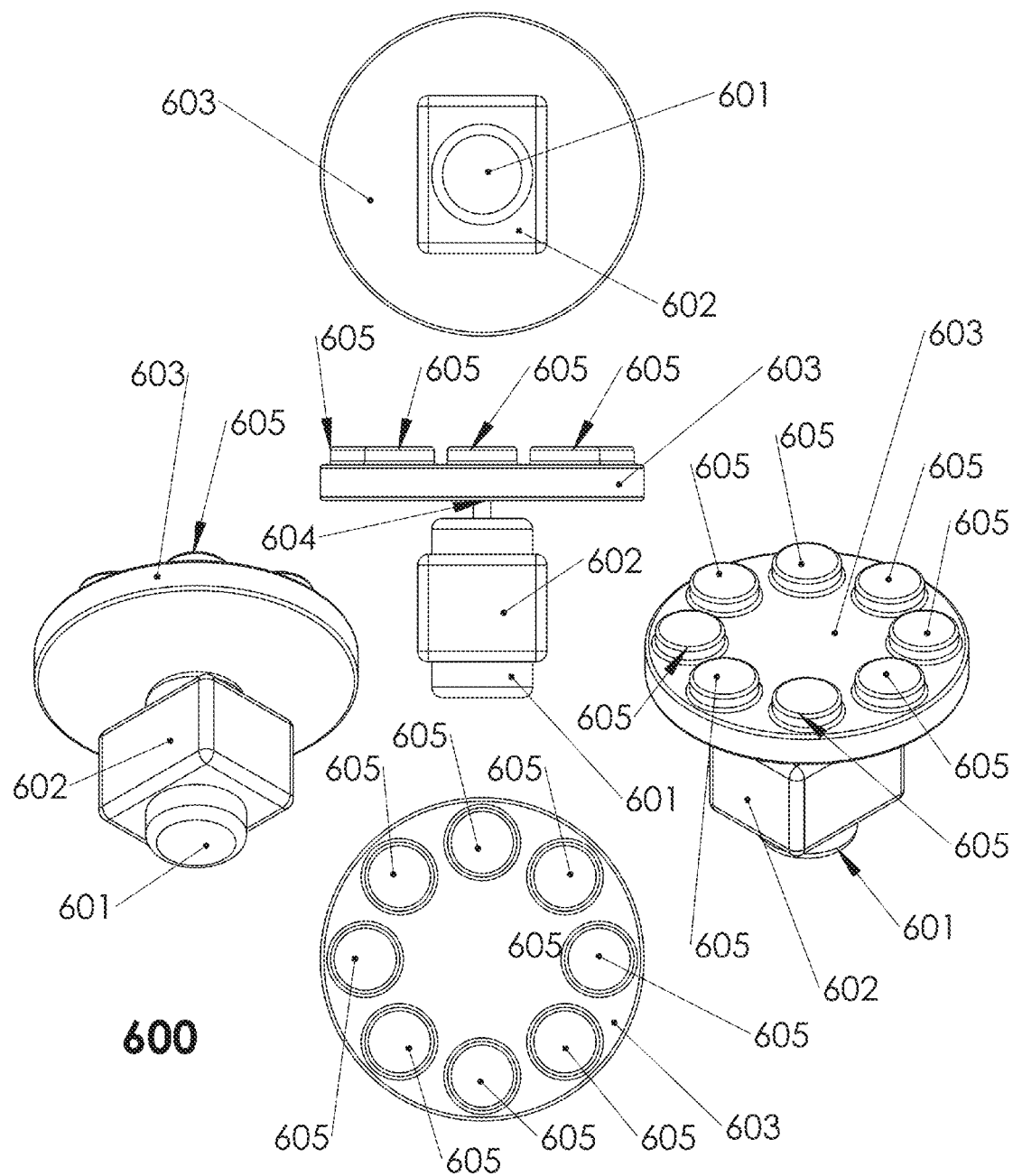
FIG. 30 are elevation, plan and perspective views of a further alternate embodiment of the present invention showing a motor driven magnet array for recharging a wireless electrical switch.

Another embodiment of the present invention in FIG. 30 illustrates a method and apparatus for utilizing the energy harvesting generator of the present invention and in conjunction with another embodiment of an ISM battery-less and wireless electrical switch. FIG. 30 shows a motor 601 driven circular array 603 of a plurality of disk type, but not limited to disk type, magnets 605 disposed on a disk 603 that is connected by an axle 604 to a rotating motor 601 contained in a motor support 602. The disk type, but not limited to disk type, magnets 605 are arranged in a manner so as to allow their corresponding magnetic fields (not illustrated but implied) to be aligned as a North to South pole configuration that disposes them with an adjacent face up opposite pole alignment.

Figure 31:
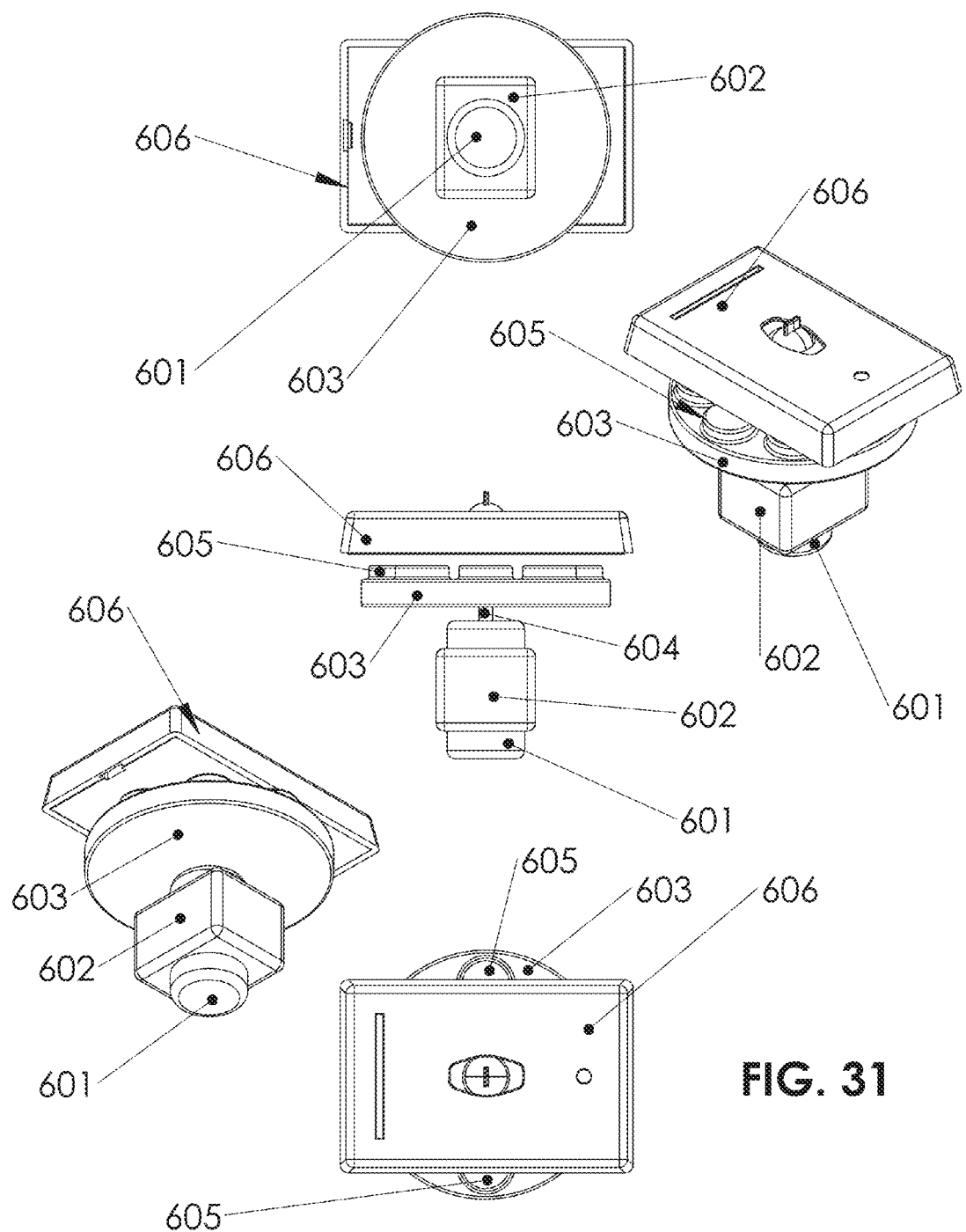
FIG. 31 are elevation, plan and perspective views of the embodiment of FIG. 30 of the present invention showing an ISM battery-less and wireless electrical switch in close proximity to a magnet array for recharging.

A further corresponding embodiment shown in FIG. 31 illustrates an operation of positioning an ISM battery-less remote switch 606 in close proximity to the disk type magnet 605 array disposed on circular array plate 603, whereby as the motor 601 is rotating and consequently as the circular array plate rotates by its connexion to the motor 601 disposed on motor axle 604. When the ISM battery-less switch 603 is placed in close proximity to the EH recharger as seen in FIG. 30, upon high speed rotation of the recharging array plate 603 and disposed arrayed disk magnets 605 their respective magnetic fields are set in motion and cut through the coil bobbin windings contained within the switch enclosure 606. This continuous rotating magnet field action continues to induce electrical currents into the coil windings that are electrically connected to a recharging bank of super capacitors that in effect act as a rechargeable battery, and where the super capacitor bank can be utilized through a USB connexion for any outside world recharging purpose such as the recharging of a cell phone, tablet, or laptop computer, and further that this accumulated charge acne be utilized by the switch circuitry itself.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments of said present invention. The various appearances of "an embodiment," "one embodiment," or "some embodiments" are not necessarily all referring to the same embodiments.

If the specification states a component, feature, structure, or characteristic "may," "might," or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

The present invention is not restricted to the particular details described herein. Indeed, many other variations of the foregoing description and drawings may be made within the scope of said present invention. Accordingly, it is the following claims including any amendments thereto that define the scope of said present invention.

The invention claimed is:

1. An electrical generator, comprising:
a plurality of turns of wire disposed substantially around a center hole and wound around said center hole and having a circumference and having a parallel axis of symmetry extending through said center hole;
a permanent magnet retained in a volume having a center axle extending therefrom and rotatable about said axis of symmetry therethrough,
at least one focus permanent magnet disposed substantially at said circumference of said plurality of turns of wire and are disposed and having magnetic poles aligned perpendicular to said axis of symmetry and one of a S and a N magnetic pole facing said plurality of turns of wire proximal said circumference and stationary relative to said plurality of turns of wire, and disposed to provide a resultant attraction between said permanent magnet and said focus permanent magnet being disposed to increase said permanent magnet magnetic flux line density in a region of said plurality of turns of wire wherein rotation of said permanent magnet about its axis of symmetry induces a flow of alternating current in said plurality of turns of wire.

2. The electrical generator as recited in claim 1, wherein said permanent magnet comprises a solid magnetic material of spherical shape
and wherein said permanent magnet's North and South magnetic lines of force are perpendicular at the poles to the axis of rotation about said axis of symmetry.

3. An electrical generator as recited in claim 2, further including an external rotatable sphere in contact with said spherical permanent magnet and a rotatable shaft that is connected to a a source of rotation of said external sphere shaft, which causes rotation of said sphere and in turn, rotation of said spherical permanent magnet.

4. The electrical generator as recited in claim 3, wherein said source of rotational motion comprises a propeller connected to a drive shaft means that is in communication with said permanent magnet.

5. The electrical generator as recited in claim 1, wherein said permanent magnet comprises a cylindrical permanent magnet
and wherein said permanent magnet's North and South magnetic lines of force are substantially perpendicular at the poles, to said axis of symmetry.

6. The electrical generator as recited in claim 1, wherein said permanent magnet is retained within a solid non-magnetic serrated wheel shape material disposed
to provide said permanent magnet's North and South magnetic lines of force to be perpendicular reference, at the poles, to said axis of symmetry.

7. An electrical generator as recited in claim 6 further including an external rotatable serrated wheel disposed to engage said generator serrated wheel and disposed on a rotatable shaft that is connected to a source of rotational motion which causes rotation of said rotatable serrated wheel permanent magnet generating electrical power by rotating said serrated wheel permanent magnet through the centre of said coil-wire form.

8. The electrical generator as recited in claim 1, further comprising a plurality of additional magnets which are disposed together with said permanent magnet within a solid non-magnetic serrated wheel shaped-material including a plurality of holes whose diameter accommodates and receives each of said permanent magnet and said a plurality of additional permanent magnets
wherein said solid non-magnetic serrated wheel shape material
and each said additional magnet and said permanent magnet's North and South magnetic lines of force are perpendicular, at the poles, are disposed to be rotatable about said axis of symmetry.

9. The electrical generator as recited in claim 1, further including
at least one external shaft connected to rotate said permanent magnet, and
a propeller connected to said external shaft rotation to cause said permanent magnet to generate electrical power by rotating said spherical permanent magnet through the centre of said coil-wire form in response to ambient moving air about said rotatable propeller.

* * * * *